(12) United States Patent
Ohanian

(10) Patent No.: US 11,878,759 B2
(45) Date of Patent: Jan. 23, 2024

(54) AERODYNAMIC WATER BOTTLE

(71) Applicant: Ara Ohanian, Doraville, GA (US)

(72) Inventor: Ara Ohanian, Doraville, GA (US)

(73) Assignee: Ara Ohanian, Doraville, GA (US)

( * ) Notice: Subject to any disclaimer, the term of this patent is extended or adjusted under 35 U.S.C. 154(b) by 0 days.

(21) Appl. No.: 17/588,750

(22) Filed: Jan. 31, 2022

(65) Prior Publication Data
US 2023/0242200 A1  Aug. 3, 2023

(51) Int. Cl.
*B62J 11/04*     (2020.01)
*A45F 3/18*      (2006.01)

(52) U.S. Cl.
CPC ............... *B62J 11/04* (2020.02); *A45F 3/18* (2013.01)

(58) Field of Classification Search
CPC .................................. B62J 11/04; A45F 3/18
USPC ............. 224/427, 425, 148.7, 414; D12/411; 15/327.5; 220/475; 215/399
See application file for complete search history.

(56) References Cited

U.S. PATENT DOCUMENTS

| | | | | |
|---|---|---|---|---|
| 3,533,526 A | * | 10/1970 | Robert | B60N 3/103 |
| | | | | 215/10 |
| D224,701 S | * | 9/1972 | Wright | D9/534 |
| 3,777,955 A | * | 12/1973 | Davies | B62J 11/04 |
| | | | | 220/521 |
| 3,920,140 A | * | 11/1975 | Kiser | B65D 23/003 |
| | | | | 215/399 |
| 4,176,770 A | * | 12/1979 | Griggs | B62J 9/21 |
| | | | | 224/451 |
| 4,920,683 A | * | 5/1990 | Weber | A01K 97/06 |
| | | | | D22/136 |
| 4,932,566 A | * | 6/1990 | Weinbaum | B65D 47/265 |
| | | | | 222/548 |
| 4,998,652 A | | 3/1991 | Champagne | |

(Continued)

FOREIGN PATENT DOCUMENTS

DE         4130320 A1 *   3/1993  .............. B62J 11/00

OTHER PUBLICATIONS

FidLock.com [online], "The TWIST principle," upon information and belief, available no later than May 12, 2022, retrieved on Sep. 26, 2022, retrieved from URL <https://www.fidlock.com/consumer/en/twist/>, 8 pages.

(Continued)

*Primary Examiner* — Justin M Larson
(74) *Attorney, Agent, or Firm* — Fish & Richardson P.C.

(57) ABSTRACT

This document describes aerodynamic water bottles for bicycles. In one aspect, an aerodynamic water bottle includes a curved front portion that includes an attachment mechanism. The attachment mechanism includes a first fastening member and a second fastening member opposite the first fastening member. At least one of the first fastening member or the second fastening member is configured to pivot away from the other of the first fastening member or the second fastening member to place the attachment mechanism in an open position. When in a closed position, the attachment mechanism includes an opening for a seat post of a bicycle to extend through. The opening is formed by a first curved surface of the first fastening member and a second curved surface of the second fastening member. A back portion includes a hollow interior vessel for storing a liquid, the back portion further comprising a spout.

19 Claims, 17 Drawing Sheets

(56) References Cited

U.S. PATENT DOCUMENTS

| | | | | |
|---|---|---|---|---|
| 5,217,116 A * | 6/1993 | Ku | ............................ | B62J 9/40 |
| | | | | 81/177.4 |
| 5,238,160 A * | 8/1993 | Faulds | ..................... | B62J 11/04 |
| | | | | 224/462 |
| 5,251,777 A * | 10/1993 | McMahon | ........... | F16M 13/022 |
| | | | | 248/291.1 |
| 5,299,720 A * | 4/1994 | Koch, III | .................... | B62J 9/22 |
| | | | | 224/406 |
| 5,301,858 A | 4/1994 | Hollander | | |
| D356,542 S * | 3/1995 | Finkiewicz | .................. | D12/411 |
| 5,427,259 A * | 6/1995 | Krastanov | ............. | A61J 9/0638 |
| | | | | 248/104 |
| 5,624,064 A * | 4/1997 | McGee, Jr. | .............. | B62J 11/04 |
| | | | | 215/373 |
| D383,875 S | 9/1997 | Morgan | | |
| 5,887,774 A * | 3/1999 | Bethune | ................... | B62J 11/04 |
| | | | | 224/406 |
| 6,023,876 A * | 2/2000 | Haddad | .................. | A01K 97/06 |
| | | | | 43/57.1 |
| 6,059,245 A | 5/2000 | Hermansen et al. | | |
| D430,492 S * | 9/2000 | Dallas, Jr. | ....................... | D9/569 |
| 6,179,166 B1 * | 1/2001 | Dallas, Jr. | ............. | B65D 23/003 |
| | | | | 222/212 |
| 6,186,383 B1 * | 2/2001 | Kobdish | .................. | B62J 11/00 |
| | | | | 248/214 |
| D586,876 S * | 2/2009 | Kern | ............................ | D22/134 |
| 7,819,413 B2 | 10/2010 | Vroomen et al. | | |
| 8,066,296 B2 | 11/2011 | White | | |
| 8,146,760 B1 * | 4/2012 | Leach | ........................ | A61J 9/00 |
| | | | | 215/11.1 |
| 8,714,174 B1 * | 5/2014 | DeSousa | ................. | E04H 15/58 |
| | | | | 135/117 |
| 8,757,413 B1 * | 6/2014 | Kephart | ...................... | B62J 9/22 |
| | | | | 206/804 |
| D714,646 S * | 10/2014 | Libman | ........................... | D9/523 |
| 8,851,095 B2 * | 10/2014 | LeAnna | .................... | A45B 3/00 |
| | | | | 135/120.1 |
| 9,452,800 B1 | 9/2016 | Dixon | | |
| 9,718,510 B2 | 8/2017 | Jacobson | | |
| 9,758,080 B2 | 9/2017 | Goldman | | |
| 9,869,111 B1 * | 1/2018 | Bailey, Sr. | ............. | F16M 13/00 |
| 9,914,556 B2 * | 3/2018 | Huang | .................. | B65D 23/001 |
| 10,059,483 B2 | 8/2018 | Cornell | | |
| 10,173,740 B2 | 1/2019 | Yeh | | |
| 10,264,859 B2 * | 4/2019 | Parker | ........................ | A61L 2/18 |
| 10,703,429 B2 * | 7/2020 | Fiedler | ..................... | B62J 11/04 |
| 11,505,269 B2 * | 11/2022 | Farrell | .................. | B65D 23/001 |
| 2004/0020950 A1 * | 2/2004 | Overbay | ................. | B65D 23/00 |
| | | | | 224/271 |
| 2006/0138147 A1 * | 6/2006 | Wagner | ................ | B65D 1/0223 |
| | | | | 220/475 |
| 2007/0012740 A1 | 1/2007 | Montgomery | | |
| 2009/0050640 A1 * | 2/2009 | Li | ........................... | A47L 13/22 |
| | | | | 220/675 |
| 2010/0059565 A1 | 3/2010 | Cote | | |
| 2012/0104063 A1 | 5/2012 | Sweigart | | |
| 2021/0169205 A1 * | 6/2021 | Eisenreich | ................ | A45F 3/18 |
| 2021/0197912 A1 * | 7/2021 | Silfen | ........................ | B62J 9/30 |
| 2021/0316900 A1 * | 10/2021 | Burt | .................. | B65D 83/0445 |
| 2021/0371032 A1 * | 12/2021 | Chang | ........................ | A45F 3/18 |
| 2022/0194507 A1 * | 6/2022 | Fiedler | ..................... | B62J 11/04 |

OTHER PUBLICATIONS

TriSports.com [online], "XLAB Torpedo System 50+," upon information and belief, available no later than Feb. 2021, retrieved on Sep. 26, 2022, retrieved from URL <https://www.trisports.com/product/xlab-torpedo-system-50-plus-?adl=1&gclid=EAIaIQobChMIhtaU-_Th5AIVD56fCh0L3AaiEAQYASABEgIXpPD_BwE>, 2 pages.

* cited by examiner

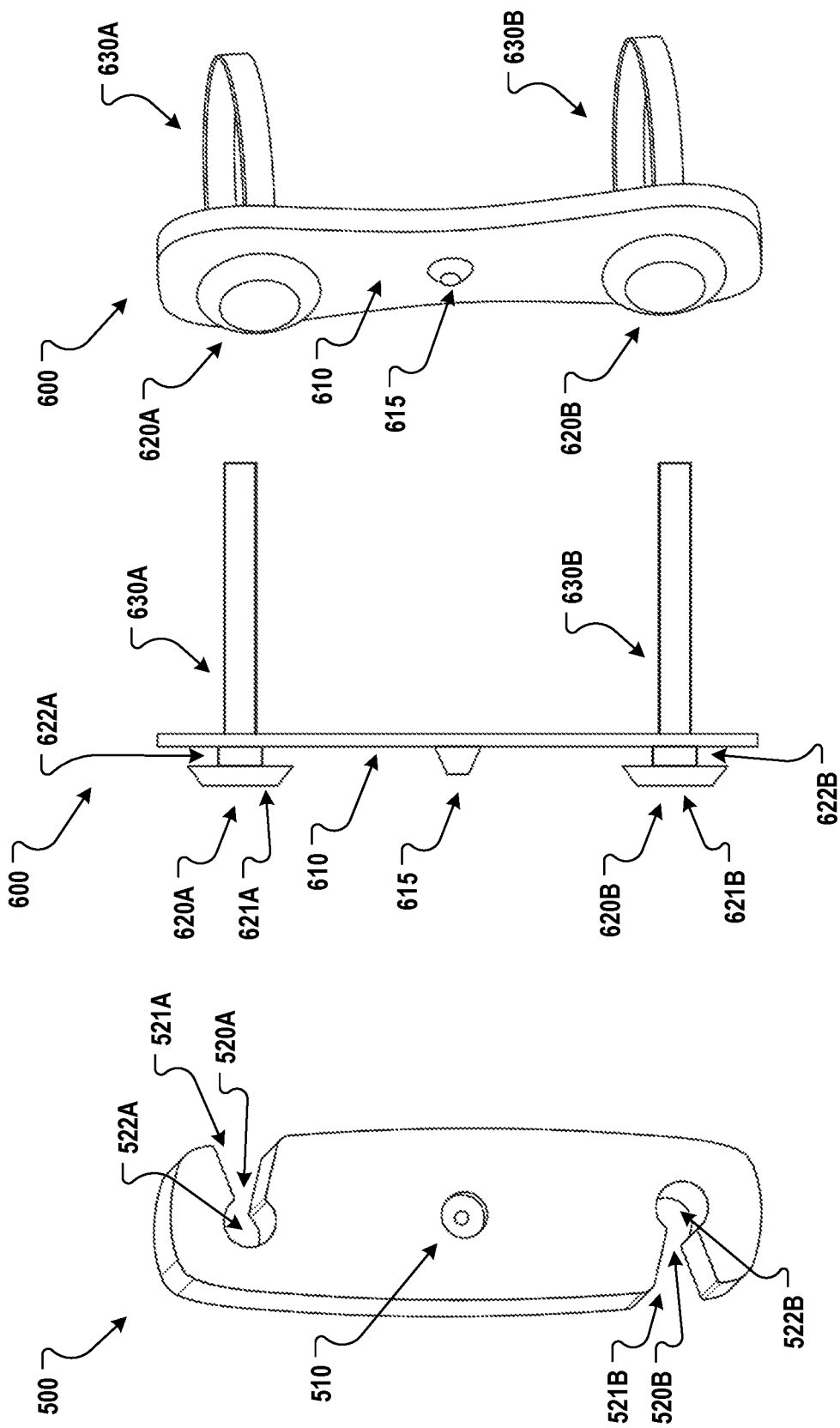

AERODYNAMIC WATER BOTTLE

BACKGROUND

Cyclists generally want their bicycles and associated equipment to be as aerodynamic as possible. This reduces the amount of drag on the bicycle, which in turns enables the cyclist to move faster and/or more efficiently, e.g., using less effort by the rider.

SUMMARY

This specification is generally related to water bottles that include an aerodynamic shape and an attachment mechanism that enables the water bottle to be easily attached to and detached from a seat post of a bicycle. In general, one innovative aspect of the subject matter described in this specification can be embodied in aerodynamic water bottles that include a curved front portion that includes an attachment mechanism. The attachment mechanism includes a first fastening member and a second fastening member opposite the first fastening member. At least one of the first fastening member or the second fastening member is configured to pivot away from the other of the first fastening member or the second fastening member to place the attachment mechanism in an open position. When in a closed position, the attachment mechanism includes an opening for a seat post of a bicycle to extend through. The opening is formed by a first curved surface of the first fastening member and a second curved surface of the second fastening member. A back portion includes a hollow interior vessel for storing a liquid, the back portion further comprising a spout.

These and other embodiments can each optionally include one or more of the following features. In some implementations, at least one of the first fastening member or the second fastening member include a second hollow vessel for storing additional liquid. In some implementations, both the first fastening member and the second fastening member are configured to pivot away from each other to place the attachment mechanism in the open position.

In some implementations, the back portion comprises an elongated tapering tail shape that is at least a threshold percentage longer than the front portion. The front portion can include a semi-spherical or parabolic curved shape. In some aspects, the attachment mechanism includes a latch that, when closed, prevents the at least one of the first fastening member or the second fastening member from pivoting away from the other of the first fastening member or the second fastening member.

In some aspects, the water bottle includes a compressible liner around at least a portion of the opening. The compressible liner can include a first liner portion disposed on the first curved surface and a second liner portion disposed on the second curved surface. The compressible liner can be made of one of rubber, a coated foam, or silicone.

In some implementations, the attachment mechanism includes a closing aid extending from the first fastening member to the second fastening member. The closing aid can be arranged between the first fastening member and the second fastening member such that, when a seat post passes between the first fastening member and the second fastening member, the seat post presses the closing aid towards the back portion.

In some implementations, the attachment mechanism includes a seam snap that includes a catch element disposed in the water bottle for receiving a hook element disposed on the first fastening member, the hook element, and a kick bar disposed in the water bottle and comprising an actuator element. The kick bar can be configured to press against the catch element and rotate the catch element in response to the actuator element being pressed. In some implementations, at least one of the first fastening member or the second fastening member includes a compartment for storing items and a lid.

In general, another innovative aspect of the subject matter described in this specification can be embodied in aerodynamic water bottles that include a curved front portion that includes an attachment mechanism disposed in an opening of the curved front portion, and a back portion that includes a hollow interior vessel for storing a liquid. The back portion further can include a spout.

In some aspects, the attachment mechanism includes a twist lock attached to a surface within the opening of the curved front portion. The twist lock can include opposite facing pin engagers that are configured to receive locking pins of a bottle holder. The water bottle can include a recess disposed between the opposite facing pin engagers and being configured to receive a pivot pin and be rotated about the pivot pin.

In some implementations, the water bottle includes a door along an outside surface of the curved front portion for accessing the opening. The attachment mechanism can include one or more channels for receiving one or more guide pieces of a bottle holder attached to a seat post. The one or more channels can include one of a wedge shape or a square shape. In some implementations, the attachment mechanism includes a groove for receiving a protruding member of a bottle holder attached to a seat post of a bicycle.

Particular embodiments of the subject matter described in this specification can be implemented so as to realize one or more of the following advantages. The aerodynamic shape of the water bottle reduces the drag caused by a seat post of a bicycle and/or the amount of drag caused by the water bottle itself relative to other types of water bottles. Reducing this drag enables a rider to move faster and/or more efficiently (e.g., using less energy or effort by the rider to move at a same speed).

Water bottle attachment mechanisms that enable the water bottle to snap or latch onto seat posts enable riders to easily remove the water bottle from the seat post and reattach the water bottle to the seat post with one hand and without having to look at the seat post when attaching or reattaching the water bottle. This improves the safety for the riders by reducing the amount of time and focus required to attach/detach the water bottle, thereby reducing the likelihood of the riders crashing their bicycles.

The attachment mechanisms of the water bottles can also include a deformable and/or compressible interior (e.g., a rubber, silicone, or coated foam liner) that fits between an opening of the water bottle and the seat post of a bicycle. This interior liner enables the water bottles to attach tightly to the seat post without latches or other mechanical devices, which also makes it easier for a rider to remove and reattach the water bottle while biking. The tight fit between the water bottle and the seat post prevents the water bottle from moving up and down the seat post while the bicycle is in motion. This makes it easier for the riders to find the water bottle without taking their focus off the path in front due to the water bottle shifting along the seat post.

The attachment mechanisms can be configured to attach to bottle holders that are installed on the seat posts. The bottle holders can include guides that guide the water bottle into the correct position and alignment such that the water bottle faces the appropriate direction to increase or maximize the aerodynamics provided by the water bottle. For example, the bottle holder can include guides and/or magnets that ensure that the water bottle maintains the proper orientation, e.g., with the front of the water bottle facing forward with respect to the bicycle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 depicts a twist lock attachment mechanism for a water bottle.

FIG. 6A is a top view of a bottle holder to which the twist lock attachment mechanism of FIG. 5 is configured to be attached.

FIG. 6B is a perspective view of the bottle holder of FIG. 6A.

Like reference numbers and designations in the various drawings indicate like elements.

DETAILED DESCRIPTION

Figure 1A:
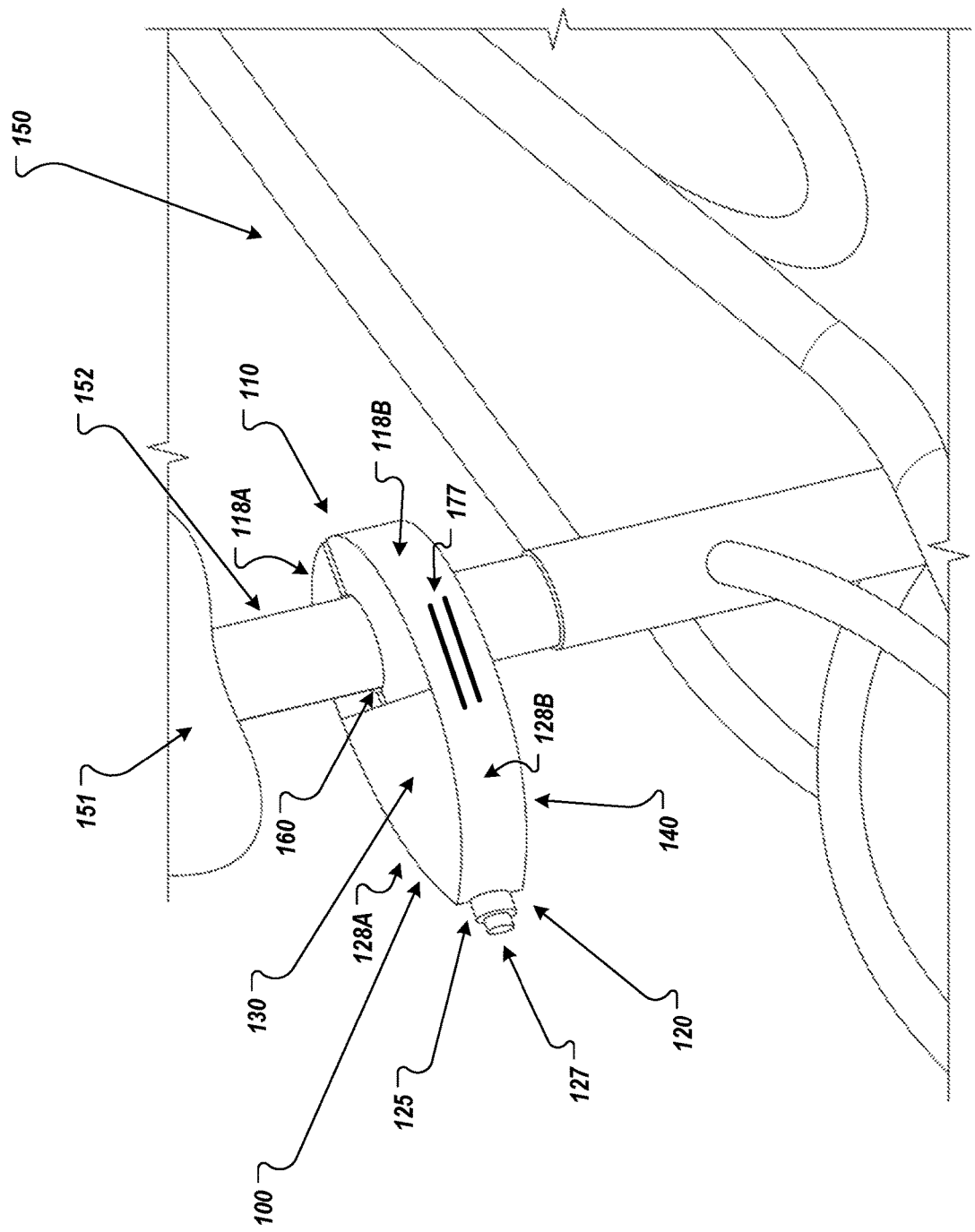
FIG. 1A depicts an aerodynamic water bottle attached to the seat post of a bicycle.

Water bottles described in this document include an aerodynamic shape and an attachment mechanism for attaching the water bottle to seat posts or other appropriate parts of bicycles. The water bottles are configured to easily attach to and detach from a seat post so that riders do not have to take their focus from the path in front of them. The water bottles can also be configured to attach snugly or tightly to the seat post to prevent the water bottles from rotating about the seat post or moving up and down the seat post, thereby staying in the proper position and orientation to increase or maximize the aerodynamics of the water bottle. Although the water bottles are described largely in terms of attaching to seat posts, the water bottles can be adapted to attach to other parts of a bicycle, e.g., the handlebars, the handlebar post, the top tube, the down tube, the seat tube, or another tube or other portion of the bicycle frame.

The water bottles have a curved front portion (or leading portion) that is configured to face forward when properly attached to the seat post of a bicycle. In this way, the front portion of the water bottle is the first portion of the water bottle to contact oncoming wind when the bicycle is moving forward and splits the wind above, below, and on both sides of the water bottle. For example, the front portion of the water bottles can have a semi-spherical or parabolic shape. The water bottles also have a back portion (or trailing portion) that can also be curved or in the form of an elongated tapering tail. For example, the water bottles can have a teardrop or a symmetric airfoil shape to make the water bottles aerodynamic and reduce drag when biking.

The front portion, or back portion, of the water bottle can include an attachment mechanism. The attachment mechanism can include fastening members that secure the water bottle to the seat post. The fastening members can form a round opening in the water bottle that fits around the seat post. One or both fastening members can be configured to open from the other fastening member so that the seat post can pass into the opening and then the fastening members can close around the seat post. A deformable and compressible liner can be attached to the exterior walls of the opening to ensure that the water bottle is attached tightly to the seat post. For example, when there is no seat post within the opening, the liner can cause the opening to have a diameter that is smaller than the diameter of a standard seat post, which is about 1.1 inches. When a seat post is within the opening, e.g., when the bottle is attached to the seat post, the seat post can compress the liner providing a snug fit between the liner and the seat post.

The water bottle and its fastening member(s) can be configured such that riders can snap the water bottle onto the seat post while riding and without taking their eyes off of the path in front of them. For example, when the rider presses the front portion (or other attachment portion) of the water bottle against the seat post, the seat post can force the fastening member(s) to open. When the seat post passes the end of the fastening member(s) and into the opening, the fastening members can close around the seat post, thereby attaching the water bottle to the seat post. For example, the fastening members can be spring loaded to the closed position when pressure is not being applied to the fastening members.

Figure 1B:
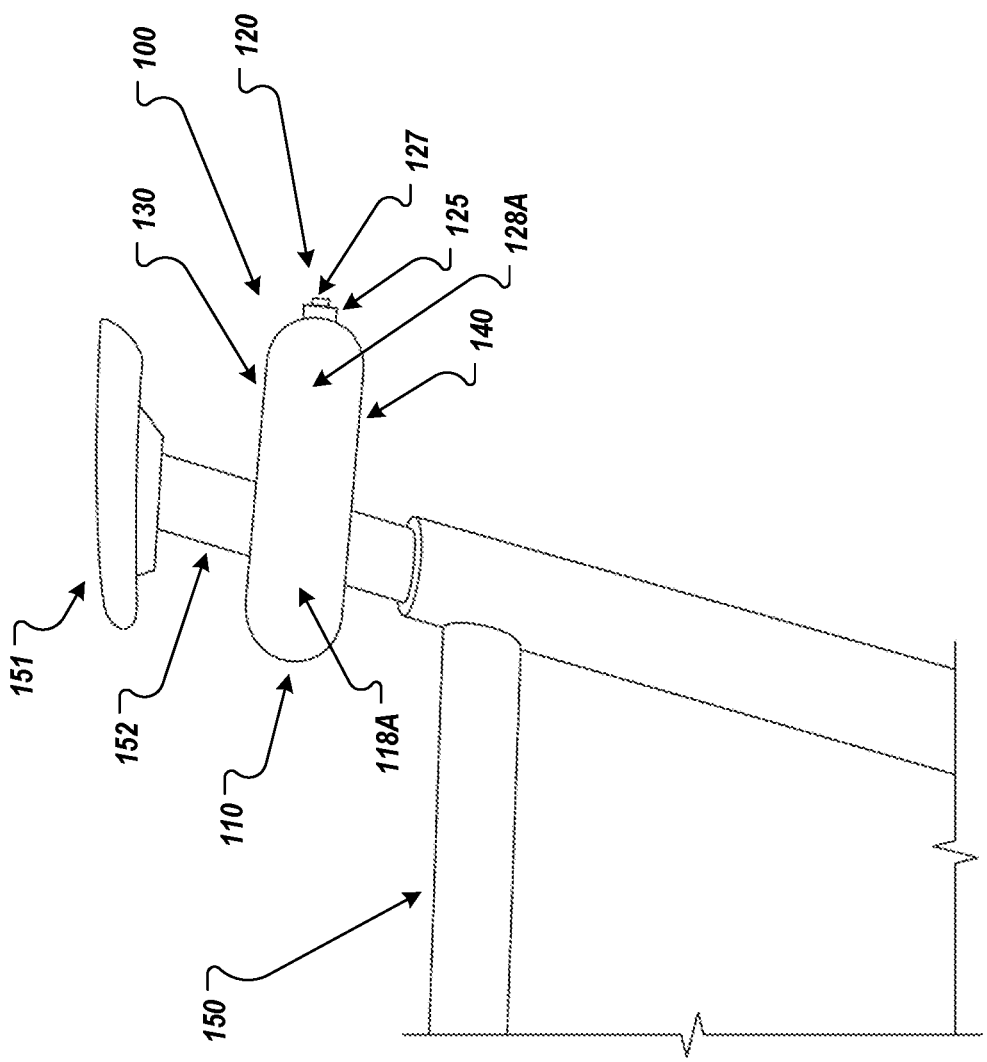
FIG. 1B is a side view of the aerodynamic water bottle of FIG. 1 attached to the seat post of the bicycle of FIG. 1.
Figure 1C:
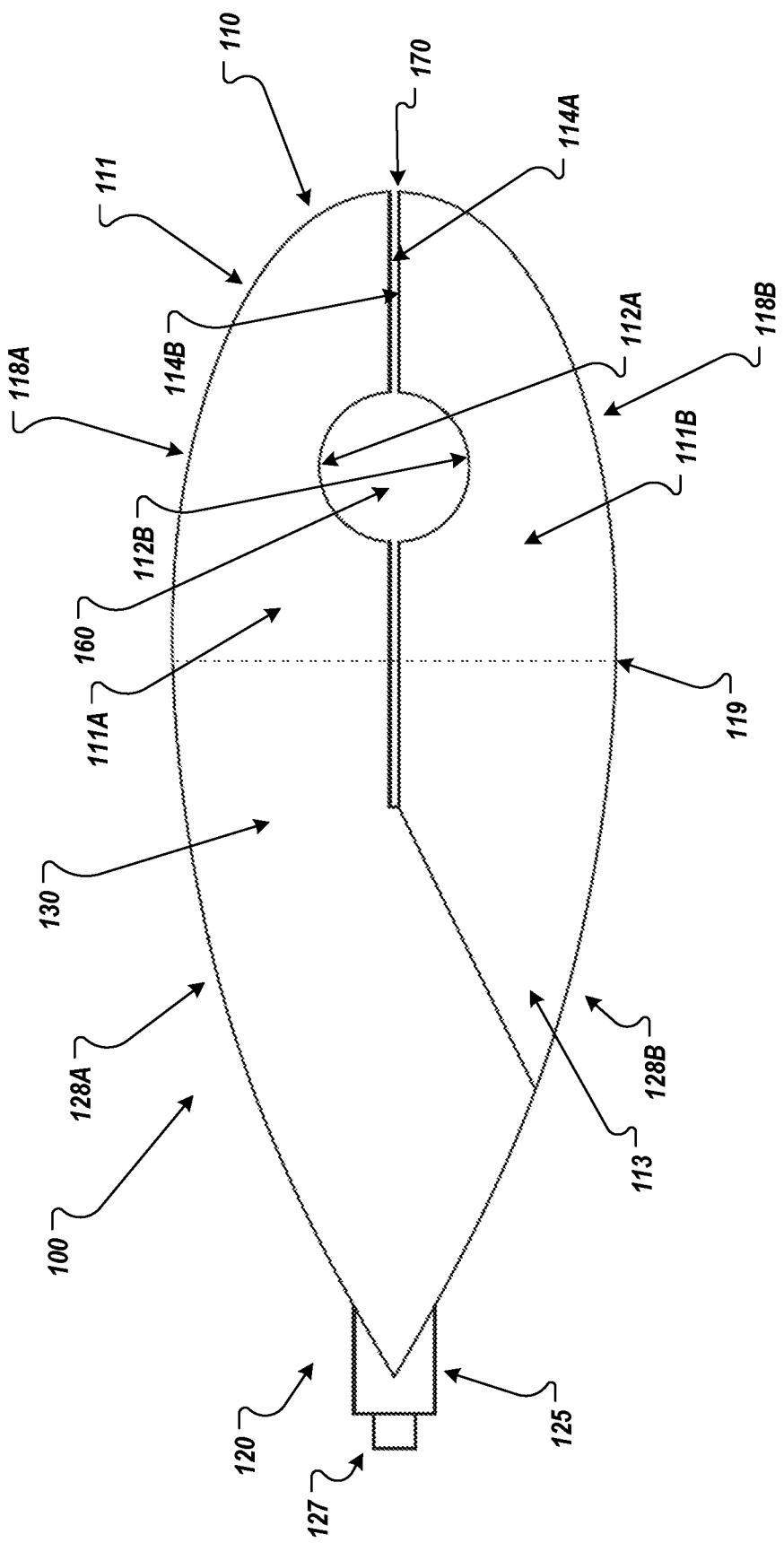
FIG. 1C is a top view of the aerodynamic water bottle of FIG. 1A in a closed position.
Figure 1D:
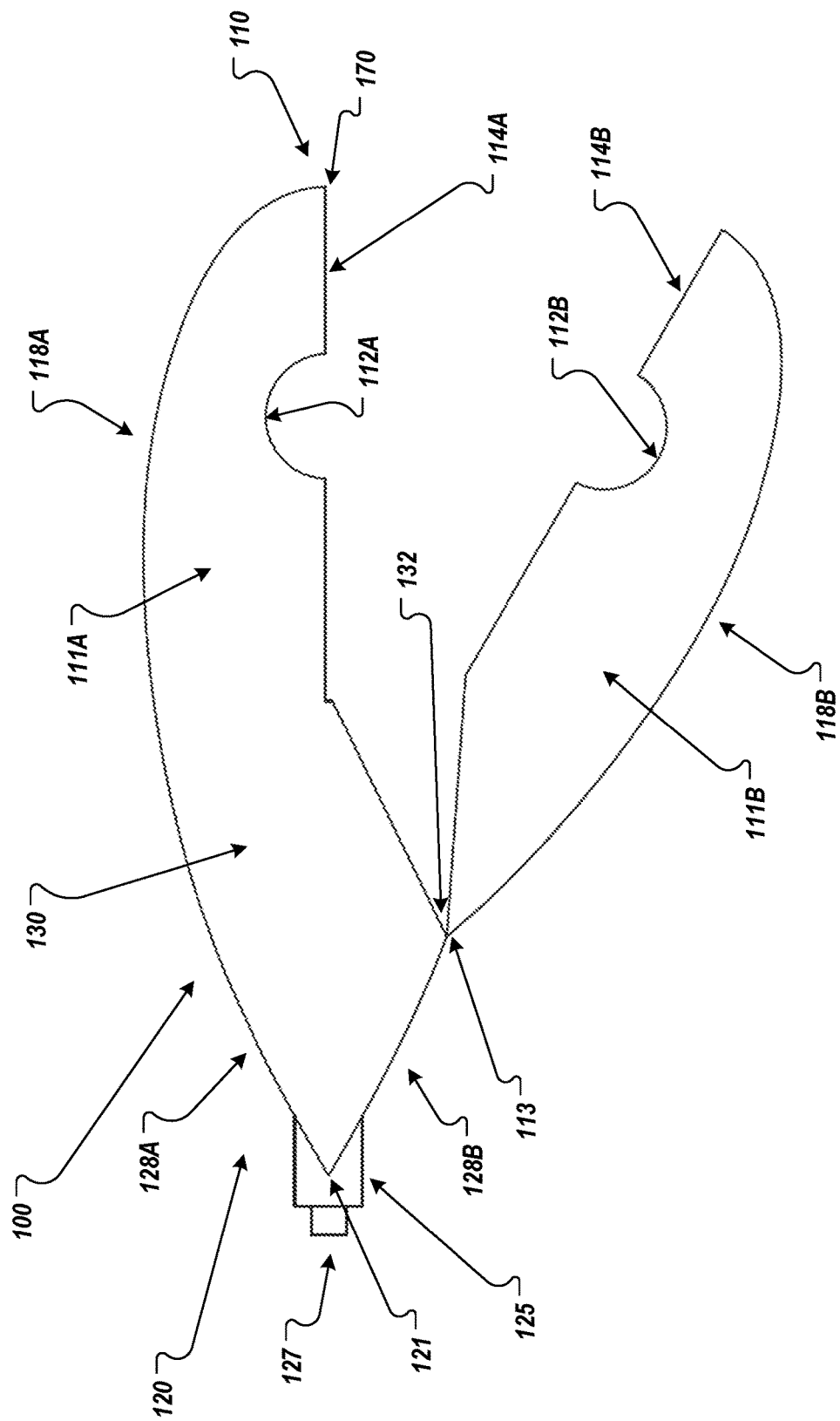
FIG. 1D is a top view of the aerodynamic water bottle of FIG. 1A in an open position.

FIGS. 1A-1D depict several views of an aerodynamic water bottle 100. FIG. 1A is a diagonal view of the aerodynamic water bottle 100 attached to a seat post 152 that holds a seat 151 of a bicycle 150. FIG. 1B is a side view of the aerodynamic water bottle 100 attached to the seat post 152. FIG. 1C is a top view of the aerodynamic water bottle 100 in a closed position. FIG. 1D is a top view of the aerodynamic water bottle 100 in an open position.

The water bottle 100 includes a front portion 110, a back portion 120, a top portion 130, and a bottom portion 140. As shown in FIGS. 1A and 1B, when the water bottle 100 is properly attached to the seat post 152, the front portion 110 faces the front of the bicycle 150 and the back portion 120 faces the back of the bicycle 150. The back portion 120 includes a spout (or nozzle or other appropriate drinking device) 125 though which water or another liquid can be poured and a cap 127 for the spout 125. Although the spout 125 is shown on the back portion 120 in this example, the spout 125 can be located anywhere on the water bottle 100, e.g., on the front portion 110 when the fastening members 118A and 118B (described below) are part of the back portion 120, either side, the top portion 130, the bottom portion 140, and/or a combination of portions, e.g., extending diagonally up from the back portion 120 and the top portion 130.

The front portion 110 has a curved shape, which can be spherical, parabolic, or another appropriate curved shape. That is, the sides 118A and 118B of front portion 110 has a curved shape. The back portion 120 can also have a curved shape or an elongated tapering shape coming to an end at a point 121. That is, the sides 128A and 128B of the back portion 120 can have a curved shape or elongated tale shape. For the purpose of the document, an elongated tail refers to a back portion that has a length that is at least a threshold percentage longer than the front portion, e.g., at least 20%, 30%, 40%, 50%, or another appropriate percentage, longer than the front portion. The length of the back portion 120 can be selected based on preferred aerodynamics, water capacity, and the ability to grip, hold, and attached/reattach the water bottle 100 to the seat post 152.

The curved front portion 110 can transition from a parabolic or semi-spherical curved shape to an elongated tail back portion 120. The front portion 110 can transition to the back portion 120 at a point at which the curvature of the front portion 110 changes directions. For example, when viewing the water bottle 100 from a location in front of the water bottle 100, the curved front portion 110 initially widens from the front-most point 170 (as seen in FIGS. 1C and 1D) on the front portion 110 of the water bottle 100 and moving towards the back portion 120. After reaching a point on either side of the water bottle 100, as indicated by line 119 in FIG. 1B, the front portion 110 transitions from widening to narrowing when viewed from the front. This line 119 can designate the transition from the front portion 110 to the back portion 120. For an elongated tail, the back portion 120 as measured from the center of the line 119 to the back-most point on the back portion 120 can be at least a threshold percentage longer than the front portion 110 as measured from the center of the line 119 to the point 170.

In some implementations, the back portion 120 is curved the same as or similar to the front portion 110. For example, the back portion 120 can have the same exterior shape as the front portion 110 when the front portion 110 is in the closed position. In another example, the back portion 120 can be flat or substantially flat (e.g., less than a threshold curvature) at the back-most point. For example, the curvature of the back-most point can come to a sudden stop and transition to a flat end.

In some implementations, each side of the water bottle 100 has an airfoil shape, e.g., a National Advisory Committee for Aeronautics (NACA) airfoil shape. That is, the side of the water bottle 100 that includes the sides 118A and 128A can have an airfoil shape and the side of the water bottle that includes the sides 118B and 128B can have an airfoil shape. For example, the sides of the water bottle 100 can have a rounded leading edge on each side 118A and 118B of the front portion 110 of the water bottle 100 and a sharp trailing edge on each side 128A and 128B of the back portion 120 of the water bottle 100. In some implementations, both sides of the water bottle 100 combine to form an airfoil, e.g., a NACA airfoil shape. Different airfoil shapes can be used based on the desired aerodynamics.

In some implementations, the sides of the water bottle 100 can also include one or more grooves 177 that extend from front to back (but not necessarily along the entire length of the sides) of the water bottle and that protrude into the water bottle. In another example, the sides of the water bottle 100 can include one or more fins that extend from front to back (but not necessarily along the entire length of the sides) of the water bottle 100 and that protrude out from the sides of the water bottle 100. The shape, length, width, depth (or height), quantity, and/or spacing between grooves 177 or fins can vary based on desired airflow around the water bottle 100 when the water bottle 100 is attached to the seat post 152.

Although, in the example shown in FIG. 1A, the top portion 130 and the bottom portion 140 are shown as being substantially flat (e.g., with less than a threshold curvature), the top portion 130 and bottom portion 140 can also be curved, e.g., parabolic vertically as seen from the front of the bicycle 150 and/or from the back of the bicycle 150. This aerodynamic shape of the water bottle 100 reduces the drag that would otherwise be caused by the seat post 152 or another shaped water bottle.

In some implementations, the top portion 130 and/or the bottom portion 140 can also have an airfoil shape. The top portion 130 and/or the bottom portion 140 can also be shaped based on other components of bicycles. For example, the top portion 130 and/or the bottom portion 140 can be shaped based on the shape and/or location of one or both tires of the bicycle relative to the placement of the water bottle 100 on the seat post 152, e.g., to fit on the seat post 152 without touching the tire(s) and/or to provide better aerodynamics when combined with the shape and location of the tire(s). For example, in some implementations, the sides of the water bottle 100 can be symmetric and have an airfoil or other curved shape for aerodynamics while the top portion 130 and bottom portion 140 are not symmetrical.

In some implementations, the vertical height of the water bottle 100 as measured from the bottom portion 140 to the top portion 130 can be extended to provide an increased aerodynamic effect, e.g., to reduce the drag caused by the seat post 152 by covering a larger portion of the seat post 152. This height of the water bottle 100 can be balanced with the desired size, weight, and capacity of the water bottle 100. For example, a water bottle 100 having a large size (e.g., greater than a threshold height) can be difficult to grasp by a rider when riding the bicycle 150 and heavier when filled with water.

At least a portion of the water bottle 100 can have a hollow interior forming a vessel for storing water or another appropriate liquid. In some implementations, part of the water bottle 100 can include compartments for storing other items. For example, part of the water bottle 100 can include a compartment with a lid on the top portion 130 of the water bottle 100 to access the compartment. This can enable a rider to carry additional items, such as first aid equipment, snacks, etc. The compartment can include divider walls to separate items. The water bottle 100 can be made of plastic, metal, or another appropriate material.

Referring to FIGS. 1C and 1D, the water bottle 100 includes a first fastening member 111A and a second fastening member 111B opposite the first fastening member 111A. Collectively, the fastening members 111A and 111B form an attachment mechanism 111 for attaching the water bottle 100 to the seat post 152. The interior shapes of the fastening members 111A and 111B form an opening 160 between the fastening members 111A and 111B. This opening 160 can fit around the seat post 152 as shown in FIG. 1A. To form the opening 160, the fastening member 111A includes a curved surface 112A and the fastening member 111B includes a curved surface 112B opposite the curved surface 112A. One of both fastening members 111A and 111B can have hollow interiors to hold water, liquid, or other items. For example, the back portion 120 of the water bottle 100 can store a liquid, while one or both fastening members 111A and 111B can include a compartment for storing other items. The fastening member(s) 111A and 111B can include a lid on the top or bottom that provides access to the compartment.

One or both fastening members 111A and 111B can be configured to open and close. In this example, the first fastening member 111A is not configured to move or open. Instead, the first fastening member 111A is integral with the back portion 120 of the water bottle 100. That is, the back portion 120 and the fastening member 111A can form a common hollow vessel that can hold water or another liquid or other substance.

The second fastening member 111B is configured to open away from the fastening member 111A. For example, the fastening member 111B and/or the back portion 120 can include a moveable joint 113, e.g., a hinge or flexible plastic joint, that enables the fastening member 111B to pivot at the moveable joint 113 and open away from the fastening member 111A, as shown in FIG. 1D. In other implementations, the fastening member 111A can include the same or a similar moveable joint that enables the fastening member 111A to open and close.

The fastening member 111B can be configured to open when pressure is applied at the point 170 at which the ends of the fastening members 111A and 111B meet or almost meet (e.g., separated by a small distance, such as one or two millimeters or another appropriate distance). For example, when a rider presses the ends of the fastening members 111A and 111B at the point 170 against the seat post 152, the fastening member 111B will open, allowing the seat post 152 to move into the opening 160. The gap between the ends of the fastening members 111A and 111B at the point 170 can be sized such that, when a standard size seat post (or round objects having a diameter within a threshold amount of the standard size seat post) presses into the gap, the fastening member 111B opens around the seat post.

In some implementations, the ends of the fastening members 111A and 111B can be configured to enable the seat post 152 to push the fastening member 111B away from the fastening member 111A. For example, the ends of the fastening members 111A and 111B at the point 170 can, when combined, create a u-shape or v-shape adapted to receive the seat post 152 within the opening formed by the u-shape or v-shape. However, such shape may reduce the aerodynamics of the water bottle 100 unless the ends of the fastening members 111A and 111B are in contact in the closed position such that air cannot enter the area between the surfaces 114A and 114B of the fastening members 111A and 111B.

Although a small gap is shown between the surfaces 114A and 114B of the fastening members 111A and 111B, respectively, the fastening members 111A and 111B can be configured such that, when the fastening member 111B is closed, the surfaces 114A and 114B touch or press against each other. In this way, the front portion 110 of the water bottle 100 has a continuous curved exterior surface without an air gap, providing better aerodynamics. In such configurations, a rider can slightly open the fastening member 111B when attaching the water bottle 100 to the seat post 152. Once the seat post 152 is past the ends of the fastening members 111A and 111B, the rider can release the fastening member 111B.

The fastening member 111B can be spring loaded so that the fastening member 111B closes when pressure is not being applied to open the fastening member 111B. For example, an extension spring can be connected between the fastening member 111B and the back portion 120 at a point 132. In another example, the fastening member 111B (and the rest of the water bottle 100) can be made of a resilient plastic that resists being opened away from the fastening member 111A and moves back into the closed position when pressure is not being applied to opening the fastening member 111B.

In some implementations, the hollow interior of the fastening member 111B can also hold water or another liquid. For example, the joint 113 can be a flexible plastic joint that includes a small channel between the hollow interior of the back portion 120. That is, the joint 113 can be formed using a flexible outer wall on the exterior side of the joint 113 and a flexible inner wall on the interior side of the joint 113. There can be a gap between these two walls, enabling water to flow between the fastening member 111B and the back portion 120. In this way, the water bottle 100 can hold more water in a larger overall vessel.

In some implementations, the hollow portion of the fastening member 111B is separate from the hollow portion of the back portion 120. In this example, the fastening member 111B can be used to hold something different, such as food, first aid kits, etc. The hollow portion of the fastening member 111B can include one or more compartments for storing the items. The top portion of the fastening member 111B can include a lid that can be opened to access the items in the compartment. The lid can be configured to snap closed. In another example, the lid can include a tab that fits into a slot of the fastening member 111B to close the lid.

Although the fastening members 111A and 111B are shown as being part of the front portion 110, the back portion 120 can be configured to include the fastening members 111A and 111B. For example, the back portion 120 can include fastening members having an elongated tapering tail shape or other airfoil shape and the front portion 110 can be an integral round shape that holds the liquid or most of the liquid and has the spout 125. This enables a rider to more easily attach the water bottle to the seat post 152 from the front of the seat post 152 rather than from the back of the seat post 152. For example, when the fastening members 111A and 111B are in the front, it is easiest for a rider to attach the water bottle 100 to the seat post 152 from behind the seat post by pressing the fastening members 111A and 111B against the seat post 152.

In other examples, the fastening members 111A and 111B can be formed in the sides of the water bottle 100 rather than the front portion 110 or the back portion 120 to enable easier side attachment to the seat post 152. The water bottle designs described below can also be configured with the fastening members in the front or sides rather than the back.

Figure 2:
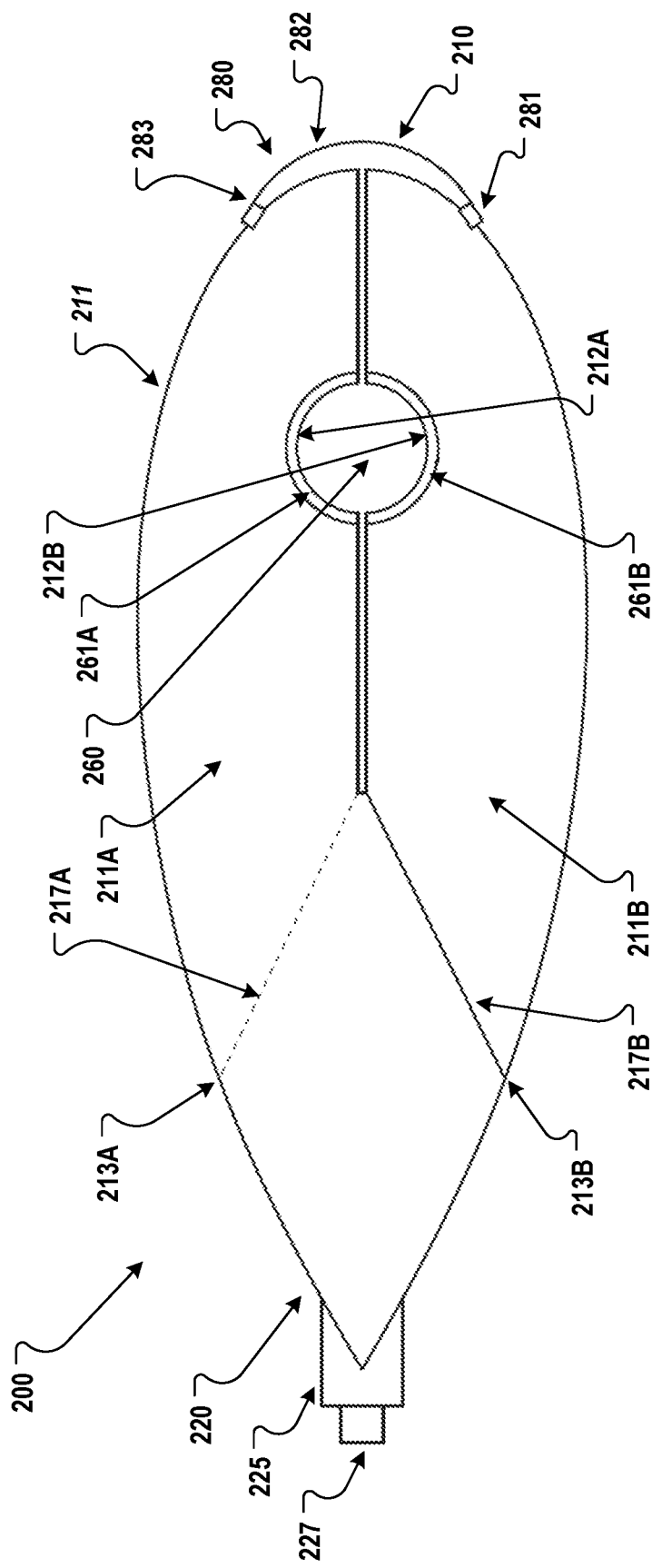
FIG. 2 is a top view of an aerodynamic water bottle with a latch.

FIG. 2 is a top view of an aerodynamic water bottle 200 with a latch 280. The water bottle 200 includes a front portion 210, a back portion 220, a top portion 230, and a bottom portion (not visible). Similar to the water bottle 100 of FIGS. 1A-1D, the water bottle 200 has an aerodynamic shape with a curved front portion 210 and an elongated tapering tail formed by the back portion 220. The back portion 220 includes a spout 225 though which water or another liquid can be poured and a cap 227 for the spout 225. As described above, a spout can be located in other portions of a water bottle.

The water bottle 200 includes an attachment mechanism 211 that includes two fastening members 211A and 211B. One or both fastening members 211A and 211B can be configured to open, similar to the fastening members 111A and 111B of FIG. 1. The line 217A indicates where the fastening member 211A would move apart from the back portion 220 by pivoting about a joint 213A. Similarly, line 217B indicates where the fastening member 211B would move apart from the back portion 220 by pivoting about a joint 213B. The joints 213A and 213B can be configured similarly to the joint 113 described above.

The interior shapes of the fastening members 211A and 211B form an opening 260 between the fastening members 211A and 211B. This opening 260 can fit around a seat post of a bicycle. To form the opening 260, the fastening member 211A includes a curved surface 212A and the fastening member 211B includes a curved surface 212B opposite the curved surface 212A.

In this example, the opening includes a compressible liner formed by a first liner portion 261A along the curved surface 212A and a second liner portion 261B along the curved surface 212B. The first liner portion 261A can be attached to the curved surface 212A using, for example, adhesives, hook and loop fasteners, or another appropriate attachment technique. Similarly, the second liner portion 261B can be attached to the curved surface 212B using, for example, adhesives, hook and loop fasteners, or another appropriate attachment technique. The liner portions 261A and 261B can be made of a compressible and deformable material, such as rubber, silicone, coated foam (e.g., rubber or plastic coated foam), and/or another appropriate material that compresses when pressed against another object but expands when not being pressed against another object.

The liner portions 261A and 261B can have a thickness (as measured out from its surface 212A or 212B, respectively) that results in an opening 260 that has a diameter that is less than the diameter of a standard seat post, or a seat post for which the water bottle 200 is adapted, of a bicycle when the liner portions 261A and 261B are not compressed. When the fastening members 211A and 211B are closed around a seat post, the seat post can compress the liner portions 261A and 261B. This compression results in a tight fit between the liner portions 261 and 261B and the seat post, preventing the water bottle 200 from moving about the seat post (e.g., from moving up or down the seat post and/or from rotation about the seat post. In this way, the front portion 210 remains facing forward even during bumpy rides and remains in the place where the rider attached the water bottle 200 to the seat post. This prevents the rider from having to search for the water bottle 200 while riding, thereby reducing the chances of the rider losing focus and losing control or crashing.

The exterior surfaces (the surfaces that contact the seat post) of the liner portions 261A and 261B can be smooth or rough. In some implementations, the exterior surfaces of the liner portions 261A and 261B include gripping features that further prevent the water bottle 200 from moving about the seat post. For example, the exterior surfaces of the liner portions 261A and 261B can have a gritty surface or dimples (e.g., rubber or plastic dimples) that provide additional friction that prevents the liner portions 261A and 261B from moving relative to the seat post.

The attachment mechanism 211 includes a latch 280. The latch 280 includes a hinge 281 connected to the fastening member 211B. The latch 280 also includes a bar 282, e.g., a flexible bar made of a flexible material such as plastic, that is connected to, and pivots about, the hinge 281. The other end of the bar 282 can be inserted into, or snapped to, a catch 283 attached to the fastening member 211A. For example, the catch 283 can include one half of a snap and the end of the bar 282 opposite the hinge 281 can include the other half of the snap. Other types of fasteners can also be used.

The latch 280 can be used in addition to, or in place of, mechanisms that cause the fastening members 211A and 211B to close when not being pressed. For example, instead of spring loading (or using a resilient plastic or other appropriate material) the fastening members 211A and 211B, the water bottle 200 can include the latch 280 for opening and closing the fastening members 211A and 211B. In another example, the fastening members 211A and 211B can be spring loaded or formed from a resilient plastic, while also including the latch 280 for additional protection from the fastening members 211A and 211B being forced open by bumpy paths.

The rider can attach the water bottle 200 to the seat post of a bicycle by opening the latch 280, e.g., removing the end of the bar 282 from the catch 283, and opening one or more both fastening members 211A and/or 211B. The rider can then pass the ends of the fastening members 211A and 211B past the seat post such that the seat post is within the opening 260. The rider (or the fastening members 211A and 211B, e.g., if spring loaded) can then close the fastening members 211A and 211B around the seat post. Within the opening 260, the seat post can compress the liner portions 261A and 261B, creating a snug fit between the seat post and the liner portions 261A and 261B. The rider can then close the latch 280, e.g., by snapping the end of the bar 282 to the catch 283.

The rider can detach the water bottle 200 from the seat post by opening the latch 280, e.g., by unsnapping the end of the bar from the catch 283. The rider can then open the fastening members 211A and 211B by pulling one from the other or pulling both away from each other. The rider can then pull the water bottle 200 away from the seat post and consume the water or other liquid in the water bottle 200.

Figure 3:
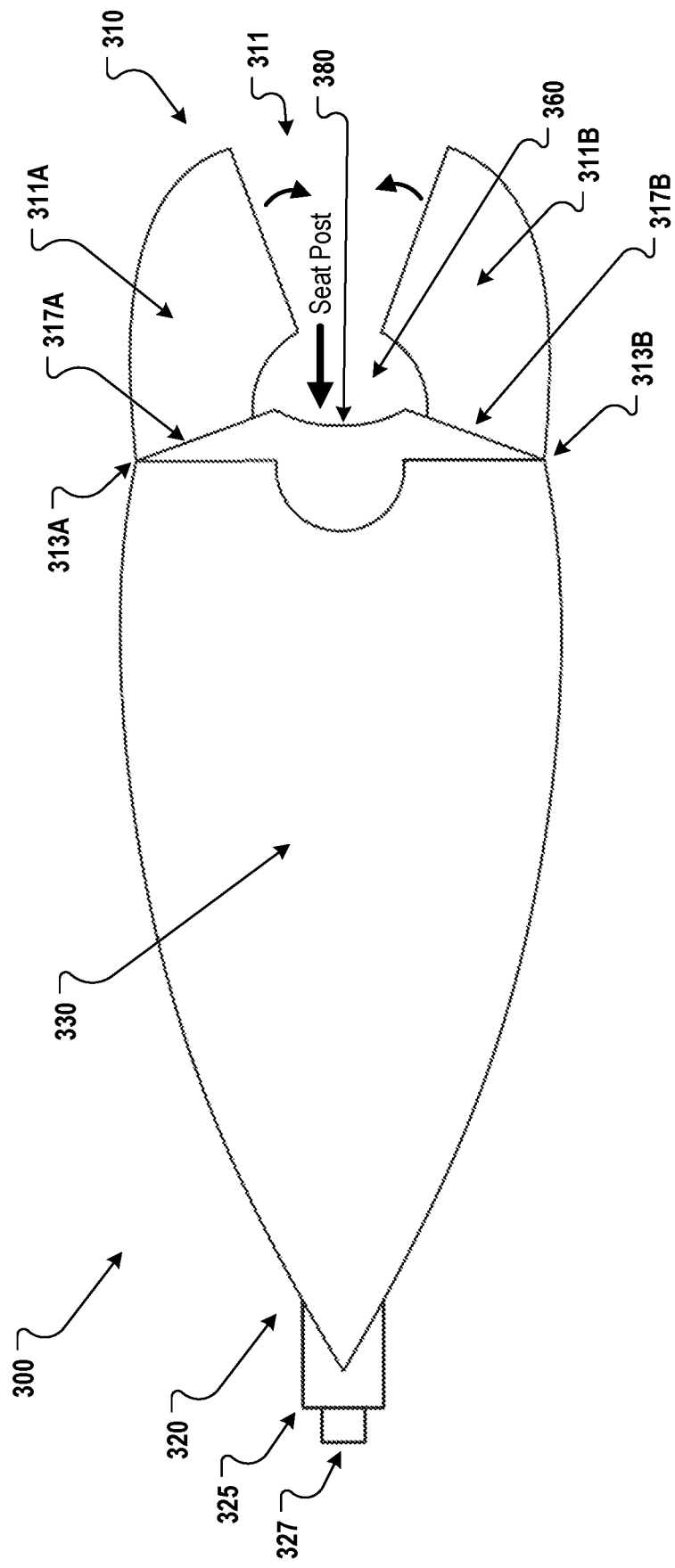
FIG. 3 is a top view of an aerodynamic water bottle with a closing aid.

FIG. 3 is a top view of an aerodynamic water bottle 300 with a closing aid 380. The water bottle 300 includes a front portion 310, a back portion 320, a top portion 330, and a bottom portion (not visible). Similar to the water bottle 100 of FIGS. 1A-1D, the water bottle 300 has an aerodynamic shape with a curved front portion 310 and an elongated tapering tail formed by the back portion 320. The back portion 320 includes a spout 325 though which water or another liquid can be poured and a cap 327 for the spout 325.

The water bottle 300 includes an attachment mechanism 311 that includes two fastening members 311A and 311B. In this example, both fastening members 311A and 311B are configured to open. The fastening member 311A can open by pivoting about a joint 313A. Similarly, the fastening member 311B can open by pivoting about a joint 313B. The joints 313A and 313B can be configured similarly to the joint 113 described above, e.g., with or without spring loading.

The interior shapes of the fastening members 311A and 311B form an opening 360 between the fastening members 311A and 311B when the fastening members 311A and 311B are in the closed position. This opening 360 can fit around a seat post of a bicycle. To form the opening 360, the fastening member 311A includes a curved surface 312A and the fastening member 311B includes a curved surface 312B opposite the curved surface 312A. Although not shown, the fastening members 311A and 311B can include a liner attached to the interior walls of the opening 360, similar to the liner portions 261A and 261B of the water bottle 200 of FIG. 2.

The closing aid 380 makes it easier to close the fastening members 311A and 311B around the seat post. The closing aid 380 can be a strip or band of material attached to the outer surfaces 317A and 317B of the fastening members 311A and 311B, respectively. For example, the closing aid 380 can be a thin strip of flexible plastic or a thin elastic band that is attached to the outer surfaces 317A and 317B. The closing aid 380 can be attached to the outer surfaces 317A and 317B using adhesives, threading, or other appropriate attachment technique.

The closing aid 380 extends between the two fastening members 311A and 311B. When the fastening members 311A and 311B are open, the rider can push the front portion 310 of the water bottle 300 towards a seat post of a bicycle such that the seat post enters the area between the fastening members 311A and 311B and makes contact with the closing aid 380. As the rider presses the water bottle 300 towards the seat post, the seat post presses the closing aid towards the opening 360. This causes the closing aid 380 to pull the fastening members 311A and 311B into the closed position.

The closing aid 380 can be used, for example, in implementations in which the fastening members 311A and 311B are not spring loaded or otherwise adapted to close on their own. The closing aid 380 can be used alone or in combination with a latch, e.g., the latch 280 of FIG. 2. The closing aid 380 enables a user to close the water bottle 300 around the seat post while riding and without taking focus from the path ahead or requiring two hands to close the fastening members 311A and 311B around the seat post.

Figure 4:
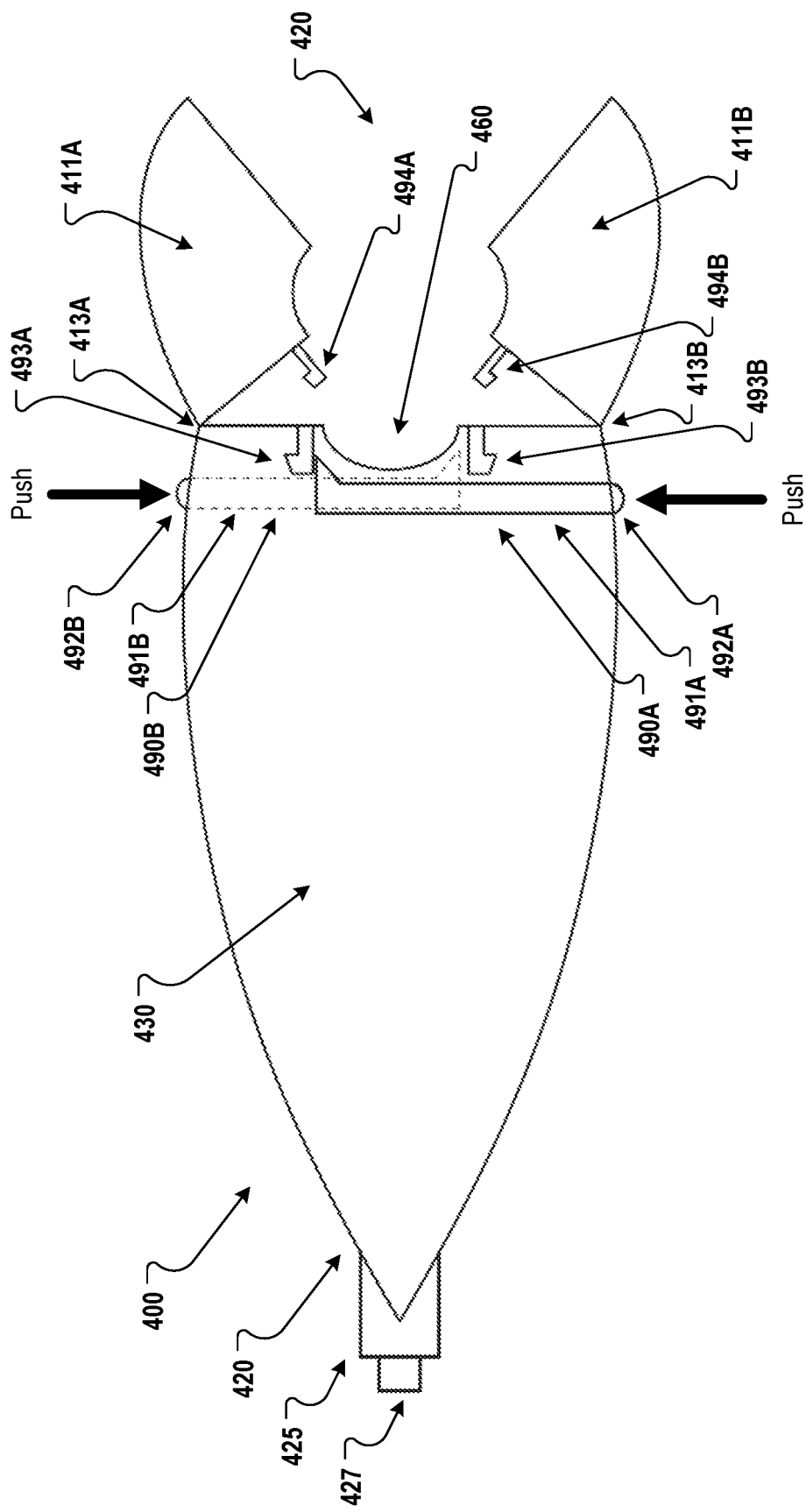
FIG. 4 is a top view of an aerodynamic water bottle with seam snaps.

FIG. 4 is a top view of an aerodynamic water bottle 400 with seam snaps 490A and 490B. The water bottle 400 includes a front portion 410, a back portion 420, a top portion 430, and a bottom portion (not visible). Similar to the water bottle 100 of FIGS. 1A-1D, the water bottle 400 has an aerodynamic shape with a curved front portion 410 and an elongated tapering tail formed by the back portion 420. The back portion 420 includes a spout 425 though which water or another liquid can be poured and a cap 427 for the spout 425.

The water bottle 400 includes an attachment mechanism 411 that includes two fastening members 411A and 411B. In this example, both fastening members 411A and 411B are configured to open. The fastening member 411A can open by pivoting about a joint 413A. Similarly, the fastening member 411B can open by pivoting about a joint 413B. The joints 413A and 413B can be configured similarly to the joint 113 described above.

The interior shapes of the fastening members 411A and 411B form an opening 460 between the fastening members 411A and 411B when the fastening members 411A and 411B are in the closed position. This opening 460 can fit around a seat post of a bicycle. To form the opening 460, the fastening member 411A includes a curved surface 412A and the fastening member 411B includes a curved surface 412B opposite the curved surface 412A. Although not shown, the fastening members 411A and 411B can include a liner attached to the interior walls of the opening 460, similar to the liner portions 261A and 261B of the water bottle 200 of FIG. 2.

The seam snaps 490A and 490B enable the rider to open and close the fastening members 411A and 411B to attach and detach the water bottle 400. The seam snap 490A includes a kicker bar 491A, an actuator element 492A at the end of the kicker bar 491A, a catch element 493A, and a hook element 494A. The actuator element 492A can include a button on the exterior of the water bottle 400. The catch element 493A is disposed within the water bottle 400 and includes an opening for receiving the hook element 494A. The hook element 494A is attached to, or formed on, the fastening member 411A.

The catch element 493A includes a hollow interior shaped to receive and hold the hook element 494A when the fastening member 411A is in the closed position. The shapes of the catch element 493A and the hook element 494A ensure that the hook element cannot release from the catch element 493A unless the catch element 493A is pushed in a particular direction, e.g., up in FIG. 4. The catch element 493A can be made of a semi-flexible, but resilient material, such as plastic or rubber such that the catch element 493A can be pushed by the kicker bar 491A but retract back into position when not being pressed.

In an at-rest position in which the kicker bar 491A is not applying pressure the catch element 493A, the catch element 493A can hold the hook element 494A inside and prevent the fastening member 411A from opening. To open the fastening member 411A, a rider can press the actuator element 492A to push the kicker bar 491A such that the other end of the kicker bar 491A presses against the catch element 493A. When the kicker bar 491A rotates the catch element 493A a sufficient amount, the hook element 493A releases from the catch element 493A. The fastening member 411A can then open.

In some implementations, the fastening member 411A can be spring loaded to remain in the open position unless pressed closed. For example, a compression spring can be attached between the fastening member 411A and the back portion 420 of the water bottle 400 at the point 499 to force the fastening member 411A into the open position when pressure is not being applied to close the fastening member 411A.

When the kicker bar 491A is released, e.g., be releasing the actuator element 492A, the catch element 493A can return to its normal position. The rider can then close the fastening member 411A by pushing the fastening member 411A inwards until the hook element 494A fully enters the catch element 493A.

The kicker bar 491A and the catch element 493A can be made of plastic, metal, or other materials suitable for being exposed to water or other liquids. In this way, the kicker bar 491A and the catch element 493A can be in the main vessel of the water bottle 400 in which water is stored. In some implementations, the main vessel may not extend to the area in which the kicker bar 491A and the catch element 493A are located. In this example, other materials can be used for the kicker bar 491A and the catch element 493A.

The seam snap 490B includes a kicker bar 491B, an actuator element 492B at the end of the kicker bar 491B, a catch element 493B, and a hook element 494B. The seam snap 490B can be configured, and function, the same as the seam snap 490A to open and close the fastening member 411B. To open the fastening members 491A and 491B, the rider can press the actuator elements 492A and 492B. The rider can then remove the water bottle 400 from the seat post or place the fastening members 411A and 411B around the seat post to attach the water bottle to the seat post. To attach the water bottle 400 to the seat post, the rider can close the fastening members, locking the hook elements 494A and 494B in their respective catch elements 493A and 493B.

FIGS. 5-13 depict additional attachment mechanisms for attaching a water bottle to a seat post. These attachment mechanisms are configured to attach to bottle holders that are configured to attach to seat posts. These attachment mechanisms are configured to both attach the water bottles to the seat posts and also to align the water bottle in the proper aerodynamic orientation, e.g., with the front portion of the water bottle facing forward with respect to the bicycle. The attachment mechanisms can be made of metal, plastic, and/or other appropriate materials.

Figure 7:
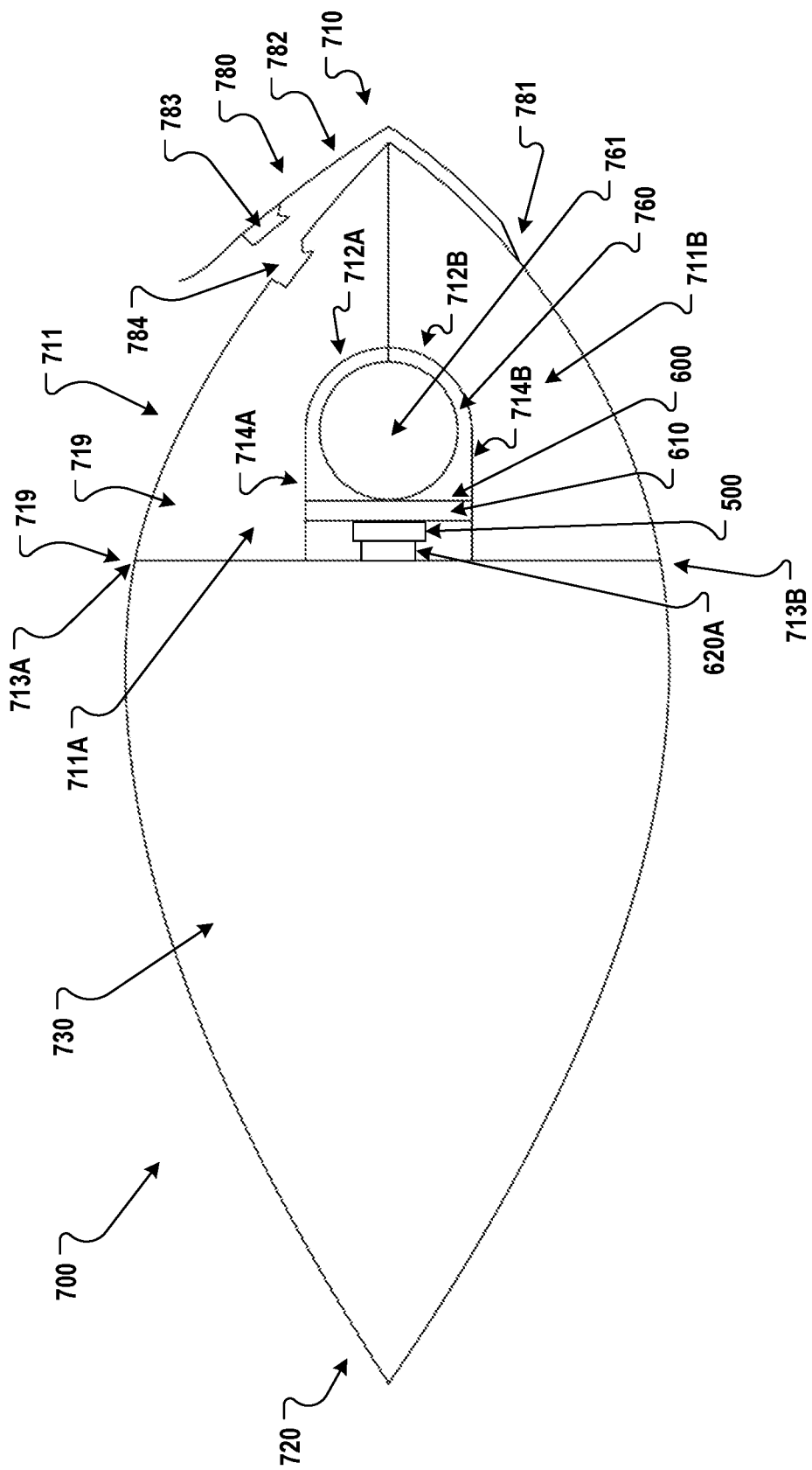
FIG. 7 is a top view of an aerodynamic water bottle.

FIG. 5 depicts a twist lock attachment mechanism 500 for a water bottle. FIG. 6A is a top view of a bottle holder 600 to which the twist lock attachment mechanism 500 is configured to be attached. FIG. 6B is a perspective view of the bottle holder 600 of FIG. 6A. FIG. 7 is a top view of an aerodynamic water bottle 700 that includes the twist lock attachment mechanism 500.

The twist lock attachment mechanism 500, which is also referred to as a twist lock 500 for brevity, includes a round recess 510 for receiving a pivot pin 615 of the bottle holder 600. The twist lock 500 also includes opposite facing pin engagers 520A and 520B that are configured to receive locking pins 620A and 620B, when the twist lock 500 is attached to a support structure 610 of the bottle holder 600.

The bottle holder 600 includes straps 630A and 630B for attaching the bottle holder 600 to a seat post of a bicycle. Each strap 630A and 630B wraps around the seat post. In some implementations, the bottle holder 600 can be installed on a seat post by inserting straps 630A and 630B around the seat post with the seat removed from the seat post. In some implementations, each strap 630A and 630B is an adjustable strap with a buckle or other attachment mechanism that enables the strap 630A and 630B to disconnected, wrapped around the seat post, reconnected, and then tightened into place on the seat post. Using a buckle or other attachment mechanisms that enables adjustment of the strap 630A and 630B enables the rider to tighten the bottle holder 600 such that it does not move up or down the seat post.

To attach the twist lock 500, and therefore the water bottle to which the twist lock is attached, to the bottle holder 600, the rider can align the round recess 515 with the pivot pin 615 with the pin engagers 520A and 520B rotated away from the locking pins 620A. The rider can then push the water bottle towards the bottle holder 600 until the pivot pin 615 is inserted into the recess 510. With the pivot pin 615 in the recess 510, the rider can rotate the water bottle, and therefore the twist lock 500 until the pin engager 520A locks into place around locking pin 620A and pin engager 520B locks into place around locking pin 620B.

The locking pin 620A includes a head 621A and a body 622A. The pin engager 520A has a wide entry point 521A leading to a round area 522A for wrapping around the body 622A between the hear 621A and the support structure 610. When rotating the twist lock 500 with respect to the bottle holder 600, the body 622A will move through the entry point 521A and snap into place in the round area 522A of the pin engager 520A.

Similarly, the locking pin 620B includes a head 621B and a body 622B, and the pin engager 520B has a wide entry point 521B leading to a round area 522B for wrapping around the body 622B between the hear 621B and the support structure 610. When rotating the twist lock 500 with respect to the bottle holder 600, the body 622B will move through the entry point 521B and snap into place in the round area 522B of the pin engager 520B.

Referring to FIG. 7, the aerodynamic water bottle 700 includes a front portion 710, a back portion 720, a top portion 730, and a bottom portion (not visible). Similar to the water bottle 100 of FIGS. 1A-1D, the water bottle 700 has an aerodynamic shape with a curved front portion 710 and an elongated tapering tail formed by the back portion 720. Although not shown, the back portion 720 (or other portion of the water bottle 700) can include a spout, similar to spout 125, though which water or another liquid can be poured and a cap, similar to cap 127, for the spout.

The water bottle 700 includes an attachment mechanism 711 that includes two fastening members 711A and 711B. One or both fastening members 711A and 711B are configured to open. The fastening member 711A can open by pivoting about a joint 713A. Similarly, the fastening member 711B can open by pivoting about a joint 713B. The joints 713A and 713B can be configured similarly to the joint 113 described above.

The interior shapes of the fastening members 711A and 711B form an opening 760 between the fastening members 711A and 711B when the fastening members 711A and 711B are in the closed position. In this example, the opening 760 is formed by a round surface 712A and a straight surface 714A of the fastening member 711A, and a round surface 712B and a straight surface 714B of the fastening member 711B. This opening 760 can fit around a seat post 761 of a bicycle to which the bottle holder 600 is attached.

The twist lock 500 is attached to the water bottle 700 and is shown in FIG. 7 as being attached to the bottle holder 600. The twist lock 500 can be attached to the water bottle 700 using an adhesive or a mechanical fastener. In another example, the twist lock 500 can be formed as an integral part of the water bottle 700.

From this top view, the top of the support structure 610 is visible, as well at the top of the twist lock 500 and the top of the head 621A. The bottle holder 600 can be attached to the seat post 761 and the twist lock 500 can be attached to the water bottle 700 such that, when the water bottle 700 is properly attached to the bottle holder 600 using the twist lock, the front portion 710 of the water bottle 700 faces forward and the top portion and bottom portion of the water bottle are properly aligned, e.g., parallel with the ground if the bicycle is standing straight up on its tires.

The attachment mechanism 700 includes a latch 780. The latch 780 includes a hinge 781 connected to the fastening member 711B. The latch 780 also includes a bar 782, e.g., a flexible bar made of a flexible material such as plastic, that is connected to, and pivots about, the hinge 781. The other end of the bar 782 includes an engagement member 783 that can be inserted into, e.g., snapped into, a catch 784 attached to the fastening member 711A. Other types of fasteners can also be used.

The latch 780 can be used in addition to, or in place of, mechanisms that cause the fastening members 711A and 711B to close when not being pressed. For example, instead of spring loading (or using a resilient plastic or other appropriate material) the fastening members 711A and 711B, the water bottle 700 can include the latch 780 for opening and closing the fastening members 711A and 711B. In another example, the fastening members 711A and 711B can be spring loaded or formed from a resilient plastic, while also including the latch 780 for additional protection from the fastening members 711A and 711B being forced open by bumpy paths.

Figure 8:
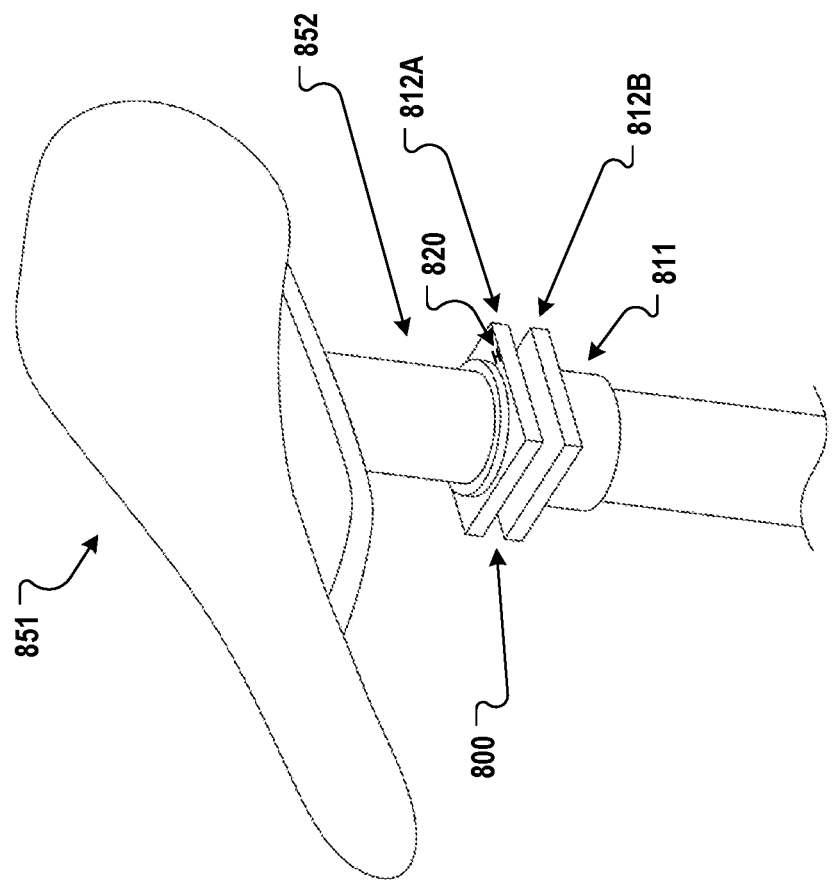
FIG. 8 depicts a bottle holder for holding a water bottle on a seat post of a bicycle.
Figure 9:
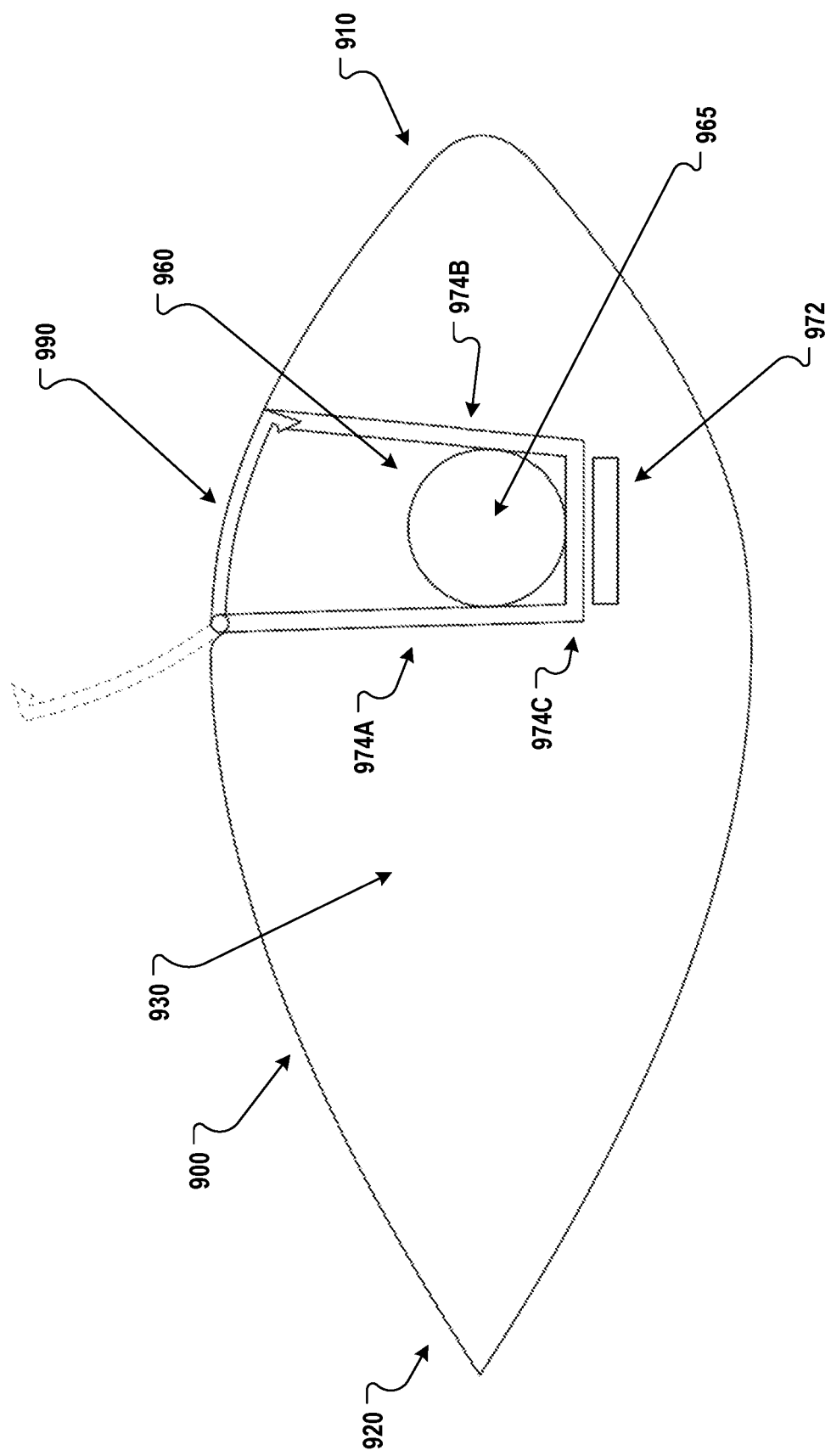
FIG. 9 is a top view of an aerodynamic water bottle configured to attach to the bottle holder of FIG. 8

FIG. 8 depicts a bottle holder 800 for receiving a water bottle. FIG. 9 is a top view of an aerodynamic water bottle 900 configured to attach to the bottle holder 800 of FIG. 8. The bottle holder 800 includes a sleeve 811 that fits around a seat post 852 that holds a seat 851 of the bicycle. The sleeve 811 can include a seat post clamp that enables the sleeve 811 to be tightened to the seat post 852. In another example, the sleeve 811 can include a tightening bold that goes through a part of the sleeve 811 and that can be rotated to tighten the sleeve 811 against the seat post 852. Other types of attachment mechanisms can also be used to keep the bottle holder 800 in place on the seat post 852.

The bottle holder 800 includes a top guide piece 812A and a bottom guide piece 812B that are spaced apart from one another. The guide pieces 812A and 812B are configured to insert into channels of a water bottle, e.g., the water bottle 900, and guide the water bottle into the correct position on a seat post. In this example, the bottle holder 800 includes two square-shaped guide pieces 812A and 812B. The water bottle 900 can include two channels for receiving the guide pieces 812A and 812B when the rider attaches the water bottle 900 to the bottle holder 800. In other examples, the bottle holder 800 can include a single guide piece, e.g., similar to the bottle holder 1000 of FIG. 10, or more than two guide pieces. Other shapes can also be used, e.g., round, triangular, etc. The channel inside the water bottle that attaches to the bottle holder 800 should be the same shape and size (for the portion of the guide piece that is inserted into the channel) such that the guide pieces fit snuggle in the channel and do not move (or move very little) when the bicycle is moving. The guide pieces 812A and 812B and the channel are configured such that when the water bottle 900 is attached to the bottle holder 800, the water bottle is in the appropriate aerodynamic orientation such that the front portion 910 of the water bottle faces forward with respect to the bicycle. The guide pieces 812A and 812B also prevent the water bottle from moving or during even when the bicycle is moving or traversing bump terrain, to maintain the improved aerodynamics at all times that the water bottle is attached to the seat post.

Each guide piece 812A and 812B can extend out from (e.g., be offset from) the outer surface of the sleeve 811 a distance 820 to enable a portion of the guide piece 812A and 813B to extend into the channel of the water bottle 900. Each guide piece 812A and 812B can extend out from the outer surface of the sleeve 811 a distance 820 that is equal to or slightly less than the depth of the channel such that the water bottle 900 fits onto the guide pieces 812A and 812B and enables the door 990 of the water bottle 900 to close around the other side of the seat post 852. The distance 820 can be, for example, 1-4 mm, e.g., 1 mm, 2 mm, 3 mm, 4 mm, or any distance between 1-4 mm.

In this example, the guide pieces 812A and 812B extend from the sleeve 811 on each of the four sides of the guide pieces 812A and 812B. In other examples, the guide pieces 812A and 812B may only extend from the side that is inserted into the channel of the water bottle 900 when the water bottle 900 is attached to the seat post 852.

Referring to FIG. 9, the water bottle 900 is similar to the water bottle 100 of FIGS. 1A-1D. In particular, the water bottle 900 includes a front portion 910, a back portion 920, a top portion 930, and a bottom portion (not visible). Similar to the water bottle 100 of FIGS. 1A-1D, the water bottle 900 has an aerodynamic shape with a curved front portion 910 and an elongated tapering tail formed by the back portion 920. The back portion 920 includes a spout, similar to spout 125, though which water or another liquid can be poured and a cap, similar to cap 127, for the spout.

Figure 11:
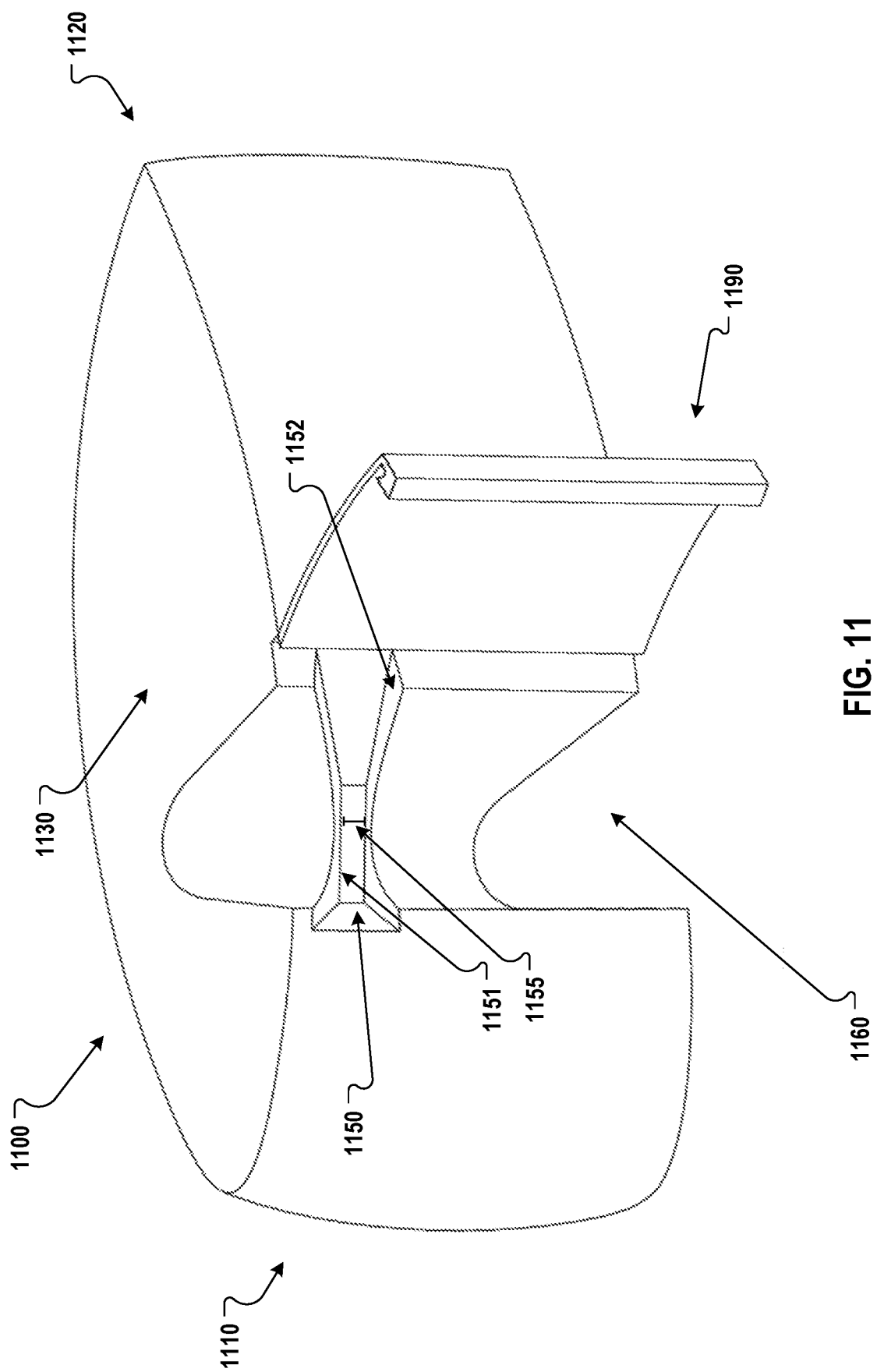
FIG. 11 depicts an aerodynamic water bottle configured to attach to the bottle holder of FIG. 10.

The water bottle 900 also includes a door 990 to an opening 960 in the water bottle 900. The opening 960 is formed by walls 974A-974C and is configured to receive a seat post 965 of a bicycle. The water bottle 900 can be hollow for storing water or another liquid, except for the portion missing to form the opening 960. The walls 974A-974C can include channels for receiving the guide pieces 812A and 812B of the bottle holder 800 when the water bottle 900 is attached to the bottle holder 800. An example channel for receiving a guide piece is shown in FIG. 11 and described below. The example of FIG. 11 can be adjusted to include two channels having a square or rectangular shape for receiving the guide pieces 812A and 812B. The channels and door 990 form an attachment mechanism for attaching the water bottle 900 to the bottle holder 800 and thus, to a seat post to which the bottle holder 800 is attached.

The water bottle 900 also includes a magnet 972 for holding the water bottle 900 against the seat post 965. The magnet 972 can be disposed in a pocket within the water bottle 900 such that the water in the bottle 900 does not contact the magnet 972. Although a single magnet 972 is shown in this example, magnets can be arranged on either side of the seat post, and can be used with any of the water bottles described in this document.

Figure 10:
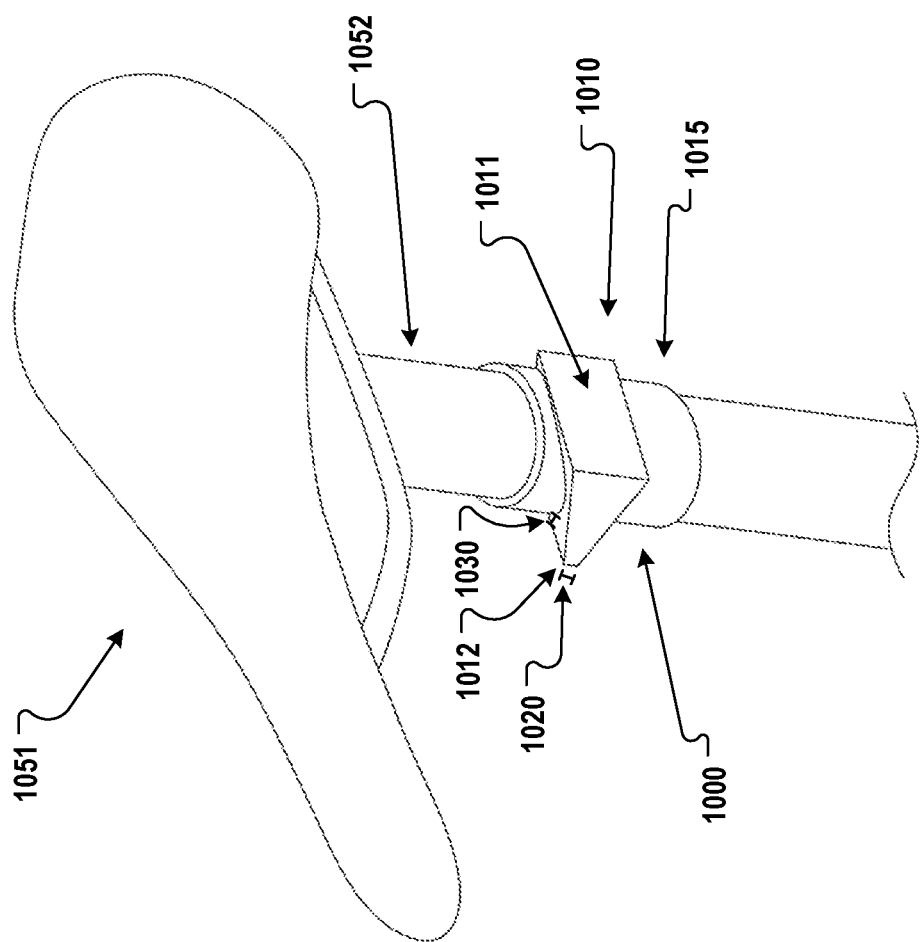
FIG. 10 depicts a bottle holder for receiving a water bottle.

FIG. 10 depicts a bottle holder 1000 for receiving a water bottle. FIG. 11 depicts an aerodynamic water bottle 1100 configured to attach to the bottle holder 1000 of FIG. 10. The bottle holder 1000 includes a wedge-shaped guide piece 1010 attached to, or formed integral with, a sleeve 1015. The sleeve 1015 can be the same as or similar to the sleeve 811 of FIG. 8 to hold the bottle holder 1000 in place on a seat post 1052 that holds a seat 1051 of a bicycle.

The wedge-shaped guide piece 1010 includes a tall surface 1011 on one side and a short surface 1012 (which is shorter than the tall surface 1011) on the opposite side to form the wedge shape. The wedge-shaped guide piece 1010 is configured to be received in a channel 1130 within an opening 1110 of the water bottle 1100. The short surface 1012 can extend from (e.g., be offset from) the nearest outer surface of the sleeve 1015 by a particular distance (as shown at 1030), e.g., 1 millimeter (mm), 2 mm, 3 mm, somewhere between 1-4 mm, or another appropriate distance. This is the distance that the end of the wedge-shaped guide piece 1010 that includes the short surface 1012 will be housed in the channel 1130 of the water bottle 1100. In some implementations, the short surface 1012 has a height (as shown at 1020) of 1-4 mm (e.g., 1 mm, 2 mm, 3 mm, 4 mm) or another appropriate height. In some implementations, the short surface is rounded or essentially has no height, e.g., ending with an edge. Similar to the guide pieces 812A and 812B, the wedge-shaped guide piece 1010 also prevents the water bottle from moving or during even when the bicycle is moving or traversing bump terrain, to maintain the improved aerodynamics at all times that the water bottle is attached to the seat post.

Referring to FIG. 11, the water bottle 1100 can be similar to the water bottle 900 of FIG. 9, with the addition of the channel 1150. For example, the water bottle 1100 includes an aerodynamic shape with a front portion 1110, a back portion 1120, a top portion 1130, a bottom portion (not shown), and a door 1190 to access an opening 1160 that fits around the seat post 1052. The water bottle 1100 can have the same aerodynamic shape as the water bottle 900 and/or other water bottles described in this document. To attach the water bottle 1100 to the bottle holder 1000, the rider can open the door 1190 and move the water bottle 1100 towards the seat post 1052 such that the seat post 1052 enters the opening 1160.

The channel 1150 includes a roof portion 1151 and a floor portion 1152 for receiving the wedge-shaped guide piece 1010. To attach the water bottle 1100 to the bottle holder 1000, the rider can open the door 1190 and move the water bottle 1100 towards the seat post 1052 such that the seat post 1052 enters the opening 1160. The rider can align the end of the channel 1160 of the water bottle 1100 with the wedge-shaped guide piece 1010 having the short surface 1012. The opening of the channel 1160 can be wider and taller than the short surface 1012 such that the rider does not have to be precise with this alignment. The channel 1160 can have a gradual reduction in width and height going from the outside of the water bottle 1100 to the middle of the water bottle 1100 such that the wedge-shaped guide piece 1010 fits snuggly in the channel 1150 when fully inserted up to the sleeve 1015. Once fully inserted, the rider can close the door 1190. The channel 1150 and door 1190 form an attachment mechanism for attaching the water bottle 1100 to the bottle holder 1000 and thus, to a seat post to which the bottle holder 1000 is attached.

The height of the channel 1150 at the back wall of the channel, as shown at 1155 can be the same as, or slightly larger than the height 1020 of the short surface 1012. The height of the rest of the channel 1150 can be the same as the height or larger, as described above.

The bottle holder 1000 is attached to the seat post 1052 such that, when the water bottle 1300 is properly attached to the wedge-shaped guide piece 1010, the front portion 1110 of the water bottle 1100 faces in the forward direction to maximize the aerodynamics of the water bottle 1100. With the bottle holder 1000 and the water bottle 1100 in the proper position, the water bottle 1100 cannot be attached to the bottle holder 1000 in any manner than one that is the proper aerodynamic orientation for the water bottle 1100. Thus, the wedge-shaped guide piece 1010 and the channel 1160 act as both attachment mechanisms and aerodynamic alignment mechanisms.

Figure 12:
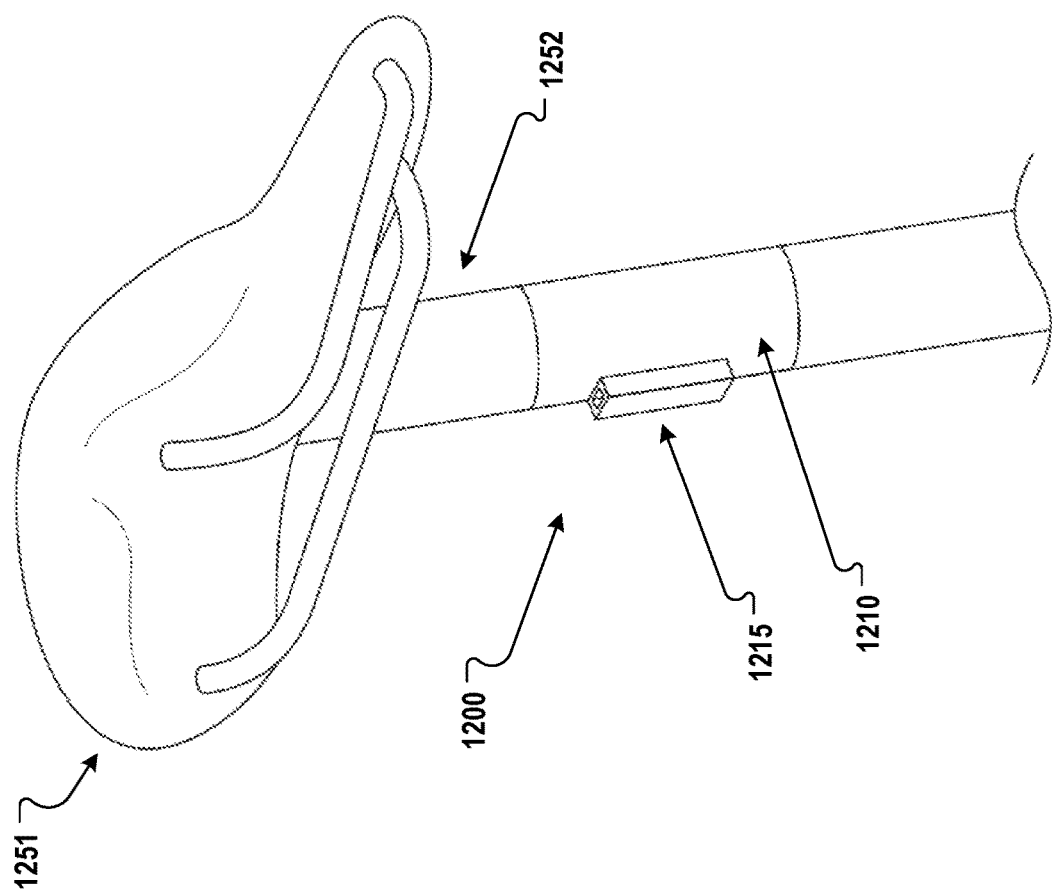
FIG. 12 depicts a bottle holder with a protruding member for receiving a water bottle.
Figure 13:
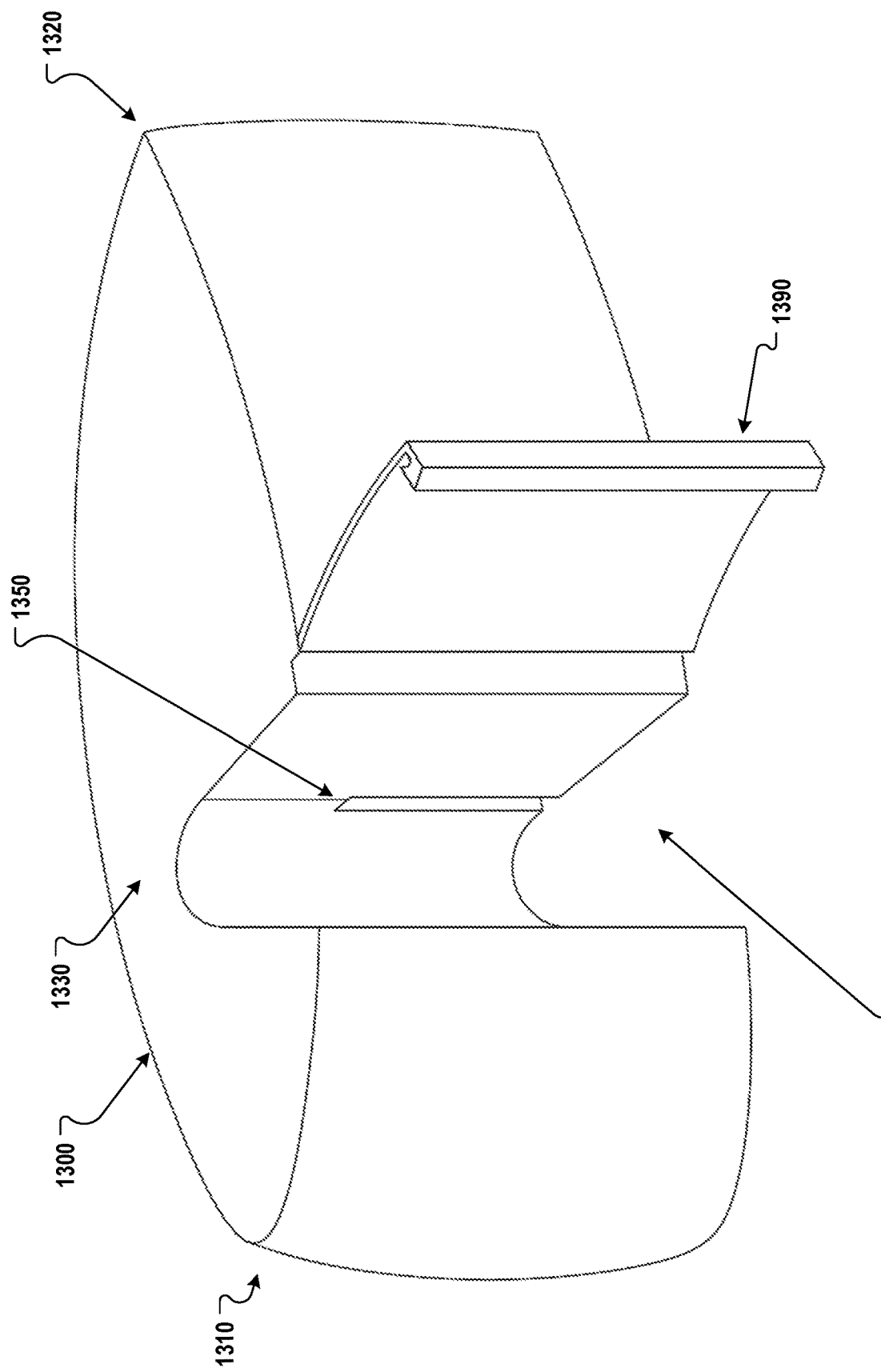
FIG. 13 depicts an aerodynamic water bottle with a groove configured to receive the protruding member of the bottle holder of FIG. 12 to attach the water bottle to the bottle holder.

FIG. 12 depicts a bottle holder 1200 with a protruding member 1215 for receiving a water bottle. FIG. 13 depicts an aerodynamic water bottle 1300 with a groove 1350 configured to receive the protruding member 1215 of the bottle holder 1200 of FIG. 12 to attach the water bottle 1300 to the bottle holder 1200. The bottle holder 1200 includes the protruding member 1215 and a sleeve 1210. The sleeve 1210 can be the same as or similar to the sleeve 811 of FIG. 8 to hold the bottle holder 1200 in place on a seat post 1252 that holds a seat 1251 of a bicycle.

In this example, the protruding member 1215 has a rectangular shape to fit securely in a rectangular shaped groove 1350. In some implementations, the top of the protruding member 1215 can have a wedge shape or other shape that guides the groove 1350 into place on the protruding member 1215 when the rider is attaching the water bottle 1300 to the bottle holder 1200.

Referring to FIG. 13, the water bottle 1300 can be similar to the water bottle 900 of FIG. 9, with the addition of the groove 1350. For example, the water bottle 1300 includes an aerodynamic shape with a front portion 1310, a back portion 1320, a top portion 1330, a bottom portion (not shown), and a door 1390 to access an opening 1360 that fits around the seat post 1252. The water bottle 1100 can have the same aerodynamic shape as the water bottle 900 and/or other water bottles described in this document. To attach the water bottle 1300 to the bottle holder 1200, the rider can open the door 1390 and move the water bottle 1300 towards the seat post 1252 such that the seat post 1252 enters the opening 1360. The water bottle 1300 should be positioned such that the groove 1350 is above the protruding member 1215. In this way, the rider can lower the water bottle 1300 such that the protruding member 1215 enters the groove 1350 to hold the water bottle 1300 on the bottle holder 1200 and in a position that increases or maximizes the aerodynamics of the water bottle 1300. The rider can then close the door 1390 of the water bottle 1300.

The bottle holder 1200 is attached to the seat post 1252 such that the protruding member 1215 is located on the back of the seat post 1252. In this position, the front portion 1310 of the water bottle 1300 faces in the forward direction to maximize the aerodynamics of the water bottle 1300. With the protruding member 1215 and the groove 1350 in the proper position, the water bottle 1300 cannot be attached to the bottle holder 1200 in any manner than one that is the proper aerodynamic orientation for the water bottle 1300. Thus, the bottle holder 1200 and the groove 1350 act as both attachment mechanisms and aerodynamic alignment mechanisms.

Figure 14:
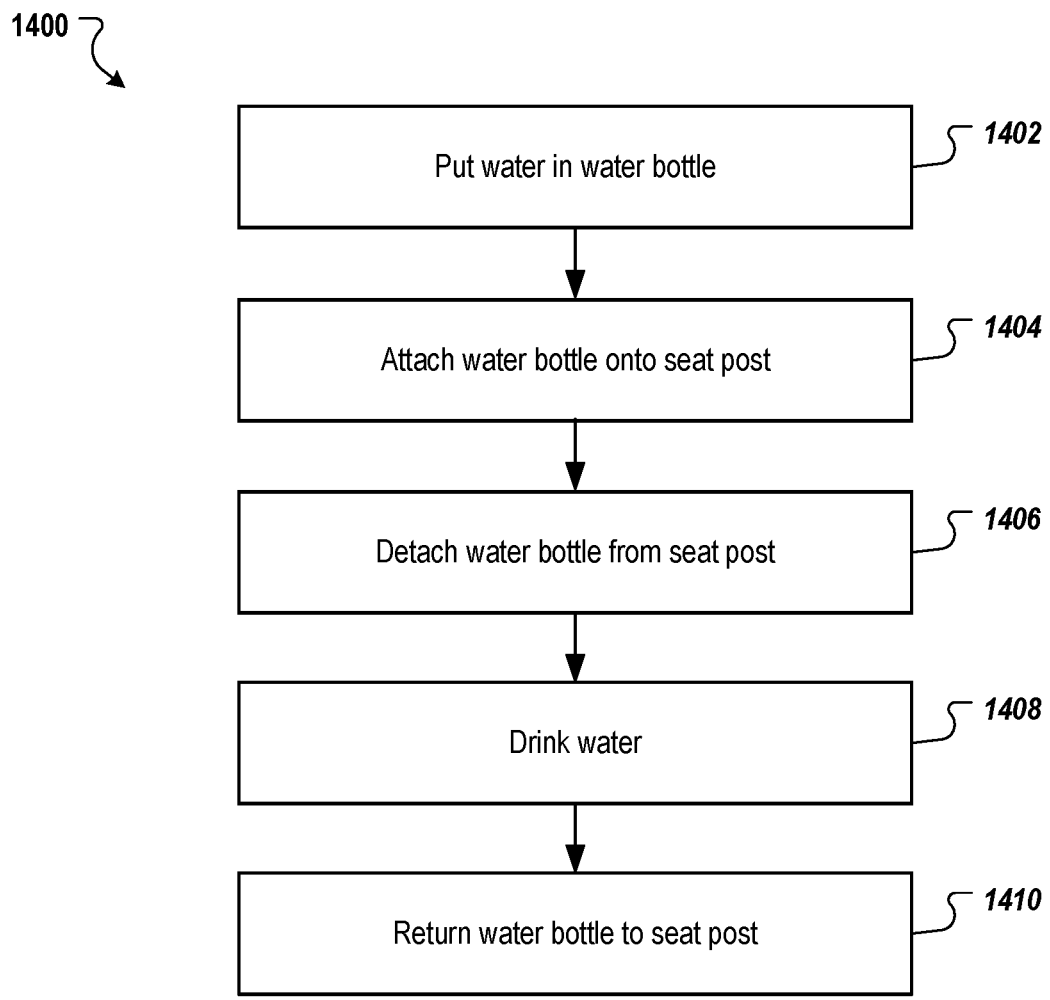
FIG. 14 is a flow diagram of an example process for using an aerodynamic water bottle.

FIG. 14 is a flow diagram of an example process 1400 for using an aerodynamic water bottle. The process 1400 can be performed by a rider of a bicycle. The aerodynamic water bottle can be one of the water bottles described in this document.

The rider puts water in the aerodynamic water bottle (1402). The rider can take the cap off of the water bottle and fill the water bottle with water or another liquid or other substance.

The rider attaches the water bottle to the seat post of a bicycle (1404). For example, the rider can attached the water bottle to the seat post prior to going for a ride on the bicycle. In some implementations, the rider can attach the water bottle to the seat post by pressing the front portion of the water bottle against the seat post. For example, as described above, an area between the ends of fastening members of the water bottle can be configured such that, when pressure is applied to the ends, one or both fastening members open away from the other fastening member.

In some implementations, the rider may pull one of the fastening members away from the other fastening member. In this example, the rider can then push the front portion of the water bottle towards the seat post and close the fastening member when the seat post is in the opening formed by the two fastening members.

In implementations in which the water bottle has a latch, the rider can open the latch and then pull one of the fastening members away from the other fastening member. The rider can then push the front portion of the water bottle towards the seat post can close the fastening member when the seat post is in the opening formed by the two fastening members. The rider can then close the latch.

In implementations in which the water bottle has a closing aid, the rider can pull one of the fastening members away from the other fastening member. The rider can then push the front portion of the water bottle towards the seat post such that the seat post goes between the two fastening members. The seat post can press the closing aid towards the opening, causing the closing aid to pull the fastening members closed around the seat post.

In implementations in which the water bottle has seam snaps, the rider can press the buttons of the seam snaps to release the fastening members, enabling the fastening members to open. The rider can then push the front portion of the water bottle towards the seat post such that the seat post goes between the two fastening members and into the opening formed between the two fastening members.

The rider detaches the water bottle from the seat post (1406). As the water bottles have attachment mechanisms that allow for easy attachment and removal of the water bottle, the rider can detach the water bottle from the seat post while riding. If the water bottle does not have a latch or seam snaps, the rider can simply reach for the water bottle below them with one hand, grab the water bottle, and pull the water bottle away from the seat post, e.g., by pulling the water bottle backwards away from the seat post such that the seat post passes between the two fastening members. If the water bottle includes a latch, the rider can first open the latch and then pull the water bottle from the seat post. If the water bottle includes seam snaps, the rider can press the button(s) to release the fastening member(s) and then pull the water bottle from the seat post.

The rider drinks water from the bottle (1408). The rider can remove the cap from the spout and drink water or whatever liquid is in the water bottle.

The rider returns the water bottle to the seat post (1410). The rider can reattach the water bottle to the seat post in a similar manner as initially attaching the water bottle to the seat post. The rider can reattach the water bottle with one hand, e.g., by pressing the front portion of the water bottle against the seat post. If the water bottle has a latch, the latch may already be open from when the rider detached the water bottle from the seat post. The rider would only have to re-secure the latch, e.g., by snapping the bar of the latch to the catch.

Figure 15:
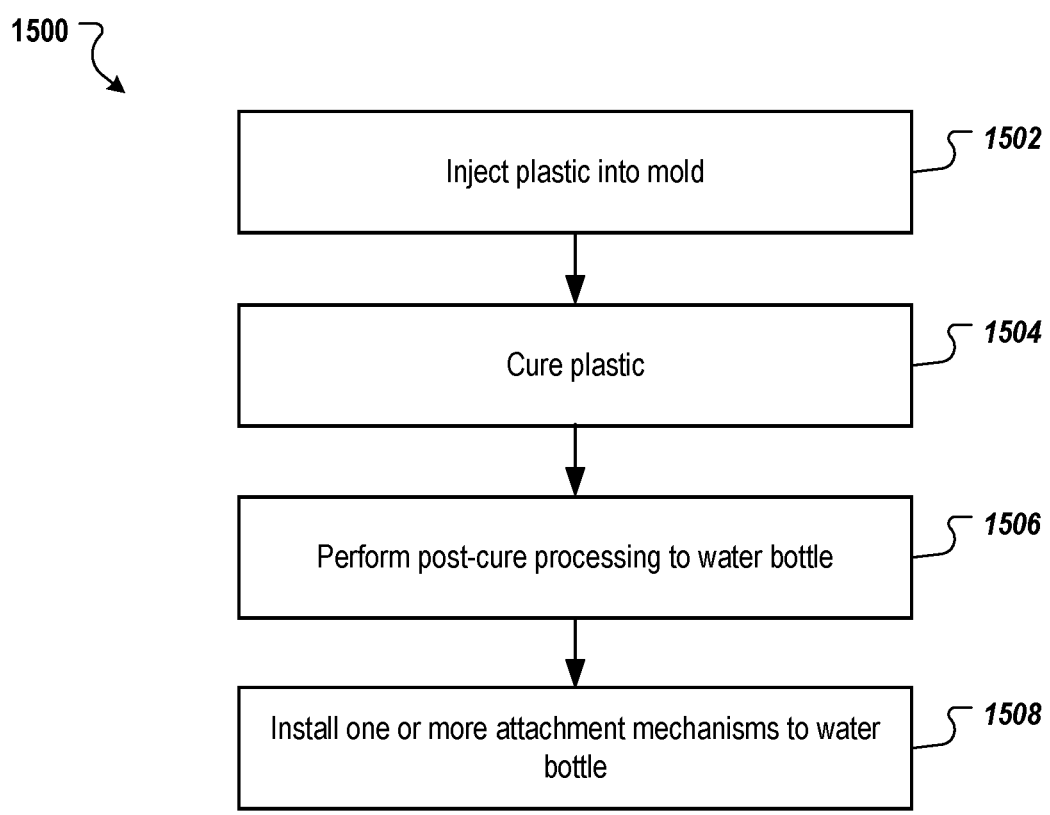
FIG. 15 is a flow diagram of an example process for manufacturing an aerodynamic water bottle.

FIG. 15 is a flow diagram of an example process 1500 for manufacturing an aerodynamic water bottle. Operations of the process 1500 can be performed using manufacturing devices and/or manually.

Plastic is injected into one or more molds (1502). The molds, which can be made of steel or another appropriate metal or other material, can be in the shape of any of the water bottles or portions thereof described above. Molten plastic can be injected into the molds using any appropriate technique. For bottles with one or more channels, e.g., the water bottle 1100 of FIG. 11, the mold can include the channel(s).

The plastic in each mold is cured (1504). For example, the molten plastic can be cooled using air, water, cooling channels, bafflers, etc. until the plastic is cured in the appropriate shape using the mold(s).

Post-cure processing can be performed on the molded plastic (1506). For example, if the water bottle includes multiple portions that are attached to each other, these portions can be attached. In a particular example, if a fastening member (e.g., fastening member 111B of FIGS. 1A-1D) is attached to the rest of the water bottle using a hinge or another appropriate mechanism, the fastening member can be attached to the water bottle after the plastic is cured. In another example, grooves can be formed into the sides of a water bottle after curing, e.g., by cutting plastic away from the sides to form the grooves.

One or more attachment mechanisms are installed on the water bottle (1508). For example, a latch, e.g., latch 280 of FIG. 2 can be attached to a front portion of the water bottle. A closing aid, e.g., closing aid 380, can be attached within an opening between fastening members of a water bottle. Seam snaps, e.g., seam snaps 490A and 490B of FIG. 4 can be installed in the water bottle. A twist lock attachment mechanism, e.g., twist lock attachment mechanism 500 of FIG. 5 can be attached to an opening between fastening members of a water bottle. A door, e.g., door 1190 of FIG. 11, can be attached to the water bottle, e.g. using a hinge.

As noted above, the water bottles described in this document can be adapted to attach to other parts of a bicycle, e.g., the handlebars, the handlebar post, the top tube, the down tube, the seat tube, or another tube or other portion of the bicycle frame. To adapt the water bottle, the attachment mechanisms can be configured to attach to tubes having larger or smaller diameters than the seat post. For example, the diameter of the opening between two fastening members can be increased or decreased based on the diameter of the tube to which the water bottle is being manufactured to attach.

The location of the attachment mechanism, spout, and/or other parts of a water bottle can be configured based on the tube to which the water bottle is to be attached. For example, a door of an opening of a water bottle can be arranged on the bottom of a water bottle that is configured to attach to the handle bars.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aerodynamic water bottle, comprising:
a curved front portion comprising an attachment mechanism, the attachment mechanism comprising a first fastening member and a second fastening member opposite the first fastening member, wherein:
at least one of the first fastening member or the second fastening member comprises a hinge configured to pivot the first fastening member or the second fastening member away from the other of the first fastening member or the second fastening member to place the attachment mechanism in an open position; and
when in a closed position, the attachment mechanism comprises an opening for a seat post of a bicycle to extend through, the opening being formed by a first curved surface of the first fastening member and a second curved surface of the second fastening member; and
a back portion comprising a hollow interior vessel for storing a liquid, the back portion further comprising a spout.

2. The aerodynamic water bottle of claim 1, wherein at least one of the first fastening member or the second fastening member comprises a second hollow vessel for storing additional liquid.

3. The aerodynamic water bottle of claim 1, wherein both the first fastening member and the second fastening member are configured to pivot away from each other to place the attachment mechanism in the open position.

4. The aerodynamic water bottle of claim 1, wherein the back portion comprises an elongated tapering tail shape.

5. The aerodynamic water bottle of claim 1, wherein the front portion comprises a semi-spherical or parabolic curved shape.

6. The aerodynamic water bottle of claim 1, wherein the attachment mechanism further comprises a latch that, when closed, prevents the at least one of the first fastening member or the second fastening member from pivoting away from the other of the first fastening member or the second fastening member.

7. The aerodynamic water bottle of claim 1, further comprising a compressible liner around at least a portion of the opening.

8. The aerodynamic water bottle of claim 7, wherein the compressible liner comprises a first liner portion disposed on the first curved surface and a second liner portion disposed on the second curved surface.

9. The aerodynamic water bottle of claim 7, wherein the compressible liner is made of one of rubber, a coated foam, or silicone.

10. The aerodynamic water bottle of claim 1, wherein the attachment mechanism comprises a closing aid extending from the first fastening member to the second fastening member, the closing aid being arranged between the first fastening member and the second fastening member such that, when a seat post passes between the first fastening member and the second fastening member, the seat post presses the closing aid towards the back portion.

11. The aerodynamic water bottle of claim 1, wherein the attachment mechanism comprises a seam snap that comprises:
a catch element disposed in the water bottle for receiving a hook element disposed on the first fastening member; the hook element; and
a kick bar disposed in the water bottle and comprising an actuator element, the kick bar being configured to press against the catch element and rotate the catch element in response to the actuator element being pressed.

12. The aerodynamic water bottle of claim 1, wherein at least one of the first fastening member or the second fastening member comprises a compartment for storing items and a lid.

13. An aerodynamic water bottle, comprising:
a curved front portion comprising an attachment mechanism disposed in an opening of the curved front portion;
a back portion comprising a hollow interior vessel for storing a liquid, the back portion further comprising a spout; and
a door along an outside surface of the curved front portion for accessing the opening.

14. The aerodynamic water bottle of claim 13, wherein the attachment mechanism comprises a twist lock attached to a surface within the opening of the curved front portion.

15. The aerodynamic water bottle of claim 14, wherein the twist lock comprises opposite facing pin engagers that are configured to receive locking pins of a bottle holder.

16. The aerodynamic water bottle of claim 15, further comprising a recess disposed between the opposite facing pin engagers and being configured to receive a pivot pin and be rotated about the pivot pin.

17. The aerodynamic water bottle of claim 13, wherein:
the attachment mechanism comprises one or more channels for receiving one or more guide pieces of a bottle holder attached to a seat post; and
the one or more channels comprise one of a wedge shape or a square shape.

18. The aerodynamic water bottle of claim 13, wherein the attachment mechanism comprises a groove for receiving a protruding member of a bottle holder attached to a seat post of a bicycle.

19. The aerodynamic water bottle of claim 13, wherein the back portion comprises an elongated tapering shape.

* * * * *